(12) United States Patent
Clippard et al.

(10) Patent No.: US 8,582,802 B2
(45) Date of Patent: Nov. 12, 2013

(54) AUTOMATIC METHOD TO GENERATE PRODUCT ATTRIBUTES BASED SOLELY ON PRODUCT IMAGES

(75) Inventors: Ric Clippard, Murfreesboro, TN (US); Rajesh Kommineni, Bozeman, MT (US); Brian Rudolph, Sussex, WI (US); Scott Rudolph, Menomonee Falls, WI (US)

(73) Assignee: Edgenet, Inc., Atlanta, GA (US)

( * ) Notice: Subject to any disclaimer, the term of this patent is extended or adjusted under 35 U.S.C. 154(b) by 379 days.

(21) Appl. No.: 12/900,820

(22) Filed: Oct. 8, 2010

(65) Prior Publication Data
US 2011/0085697 A1    Apr. 14, 2011

Related U.S. Application Data

(60) Provisional application No. 61/250,326, filed on Oct. 9, 2009.

(51) Int. Cl.
*G06K 9/00*    (2006.01)
(52) U.S. Cl.
USPC ........................................................ 382/100
(58) Field of Classification Search
USPC ........................................................ 382/100
See application file for complete search history.

(56) References Cited

U.S. PATENT DOCUMENTS

| | | | |
|---|---|---|---|
| 5,085,325 A | 2/1992 | Jones et al. | |
| 5,579,471 A | 11/1996 | Barber et al. | |
| 5,751,286 A | 5/1998 | Barber et al. | |
| 5,751,450 A | 5/1998 | Robinson | |
| 5,793,888 A * | 8/1998 | Delanoy | 382/219 |
| 5,978,804 A | 11/1999 | Dietzman | |
| 6,192,150 B1 | 2/2001 | Leow et al. | |

(Continued)

OTHER PUBLICATIONS

Bezdek, J.C., "Pattern Recognition with Fuzzy Objective Function Algorithms," Kluwer Academic Publishers, Norwll, MA, 1981 (Book).

(Continued)

*Primary Examiner* — Shefali Goradia
(74) *Attorney, Agent, or Firm* — Joesph T. Leone, Esq.; Daniel A. Blasiole; DeWitt, Ross & Stevens, S.C.

(57) ABSTRACT

Disclosed is a method to generate data describing a product. The method includes the steps of comparing a digitized query image of the product to digitized pre-existing product images in a pre-existing product database. The pre-existing product database is organized using a taxonomy and an ontology. The pre-existing product images are linked to a corresponding node in the taxonomy and are also linked to attribute data and attribute value data in the ontology. At least one pre-existing product image is then retrieved that most closely matches the query image based on at least one matching criterion selected in whole or in part by a user. From the pre-existing product database is extracted the node in the taxonomy, the attribute data, or the attribute value data linked to the pre-existing product image retrieved earlier. In this fashion, product data relevant to the item depicted in the query image can be generated automatically from existing product data.

20 Claims, 11 Drawing Sheets

(56) References Cited

U.S. PATENT DOCUMENTS

| | | | |
|---|---|---|---|
| 6,529,635 | B1 | 3/2003 | Corwin et al. |
| 6,751,343 | B1 * | 6/2004 | Ferrell et al. ............. 382/145 |
| 6,760,714 | B1 | 7/2004 | Caid et al. |
| 6,963,425 | B1 | 11/2005 | Nair et al. |
| 7,103,223 | B2 | 9/2006 | Crill |
| 7,386,170 | B2 * | 6/2008 | Ronk et al. ............. 382/190 |
| 8,144,921 | B2 * | 3/2012 | Ke et al. ............. 382/100 |
| 8,243,999 | B2 * | 8/2012 | Tobin et al. ............. 382/115 |
| 2007/0005566 | A1 | 1/2007 | Bobick et al. |
| 2007/0061333 | A1 | 3/2007 | Ramer et al. |
| 2007/0061335 | A1 | 3/2007 | Ramer et al. |

OTHER PUBLICATIONS

Chua et al., "Content-Based Retrieval of Segmented Images," *Proceedings of ACM Multimedia Conference*, pp. 211-128, 1994 (Abstract only provided).

Dunn, J.C., "A Fuzzy Relative of the ISODATA Process and Its Use in Detecting Compact Well-Separated Clusters," *Journal of Cybernetics*, 3:32-57, 1973.

Swain, Michael J., "Color Indexing," *International Journal of Computer Vision*, vol. 7:1, pp. 11-32, 1991.

* cited by examiner

FIG. 1 – PRIOR ART

AUTOMATIC METHOD TO GENERATE PRODUCT ATTRIBUTES BASED SOLELY ON PRODUCT IMAGES

CROSS-REFERENCE TO RELATED APPLICATIONS

Priority is hereby claimed to provisional application Ser. No. 61/250,326, filed Oct. 9, 2009, which is incorporated herein.

BACKGROUND

The Global Data Synchronization Network ("GDSN"®) is an internet-based, interconnected network of interoperable data pools. ("GDSN"® is a registered trademark of GS1, Inc. a Belgian non-profit corporation.) The "GDSN"® network includes a global registry known as the "GS1 Global Registry" ("GS1"® and "GS1 Global Registry"® are also registered trademarks of GS1, Inc.). The "GS1"® registry allows companies to exchange standardized and synchronized product data with their trading partners using a standardized product classification system. By standardizing the classification and exchange of product data, the "GDSN"® network allows business partners to have consistent product data in their systems at the same time. Standardization of product data also assures that the data exchanged between trading partners is accurate.

Third-party hierarchical data pools are used to organize the data before submitting the data to the registry. In practice, the data pools are organized taxonomically—related products and their attributes are logically organized within the taxonomy (using super-type/sub-type relationships) to ease locating and evaluating products of interest. In short, each product has a corresponding position within the taxonomy, and each product is associated with a host of product attributes. For example, refrigerators as a general class of goods would be located in the taxonomy under "kitchen appliances," or "major appliances," or some other logical heading. The corresponding attributes for any given refrigerator are many, for example: external size, internal size, color, external design (e.g., freezer on top, freezer on bottom, or side-by-side), internal design (number of drawers, shelves, etc.), available options (ice-maker, water dispenser), etc. While very simple products may require only a relatively small number of associated attributes to be described accurately, completely, and unambiguously within the data pool, more complicated products (such as power tools, appliances, vehicles, etc.) require literally hundreds of attributes to be specified in order to identify each unique product unambiguously (and also to comply with the various promulgated standards).

Thus it is that very nearly every company in the world has its own database filled with data about the products they make, or sell, or buy. That is, most companies have reams of product attribute data. In practical terms, these databases function like electronic catalogs. Customers can electronically query the databases to place orders, to manage vendors, to budget future inventories, etc. But as a general proposition, the data is not organized in any systematic fashion across companies. Each company organizes its own data in its own way. The "GDSN"® network framework is an attempt to standardize how those reams of data are organized and communicated so that companies can do business with each other more easily. Typically, difficulties arise when one company needs to change information in its database, or to add a new product to its database, or needs to modify the taxonomic definitions within the database. For example, in 1990, the taxonomic entries for telephone equipment would not have included nodes or product attributes for items such wireless texting devices and combination camera/cell phones—items that did not exist in 1990, but are now ubiquitous.

In practice, the "GDSN"® network connects trading partners to a registry via a network of interoperable GDSN-certified data pools. Within the "GDSN"® network, trade items are identified using a unique combination of the GS1 Identification Keys called Global Trade Item Numbers (GTIN) and Global Location Numbers (GLN). There are five general steps that allow trading partners to synchronize product, location and price data with each other, see FIG. 1, where the reference numerals refer to the following steps:

1. Load Data: The seller registers product data and company information in its data pool.
2. Register Data: A small subset of this data is sent to the GS1 Global Registry.
3. Request Subscription: The buyer, through its own data pool, subscribes to receive a seller's information.
4. Publish Data: The seller's data pool publishes the requested information to the buyer's data pool.
5. Confirm & Inform: The buyer sends a confirmation to the seller via each company's data pool, which informs the supplier of the action taken by the retailer using the information.

The most laborious step in the process, for both Suppliers/Sellers and Retailer/Buyers is loading their data into the data pools in a format that is acceptable to the Global Registry. In short, to populate the Source Data Pool and the Recipient Data Pool with accurate product data requires a vast amount of human manpower. For each new item, or new version of an old item, a meticulous, accurate, and complete list of product attributes must be entered into the data pool. The product itself must also be matched to the proper node in the taxonomy. Currently, this data entry is done entirely by hand, product-by-product, model-by-model, version-by-version, for each and every unique product defined within the data pools. This is a monumental effort that requires constant diligence and effort because products defined within the data pools are constantly changing. Likewise, the product itself must be entered at a proper node within the taxonomy.

Thus, there exists a long-felt and unmet need to automate and speed the process of defining product attributes, entering the product attributes into a data pool, and properly locating a product within a taxonomy in a product data pool.

SUMMARY

Disclosed and claimed herein is a method to generate data describing a product. The method comprises comparing a digitized query image of the product to digitized pre-existing product images in a pre-existing product database. The pre-existing product database is preferably organized using a taxonomy and an ontology. The pre-existing product images are linked to a corresponding node in the taxonomy and are also linked to attribute data and attribute value data in the ontology for each pre-existing product depicted in the pre-existing product images. At least one pre-existing product image is then retrieved from the database. The product image(s) retrieved are those that most closely matche the query image based on at least one matching criterion selected in whole or in part by a user. From the pre-existing product database is then extracted the node in the taxonomy, the attribute data, and/or the attribute value data linked to the pre-existing product image retrieved. In this fashion, product data relevant to the item depicted in the query image can be generated automatically from pre-existing product data.

The method is executed in a special-purpose computer or a suitably programmed general-purpose computer.

In another version of the method, the comparing step comprises comparing the query image to all of the pre-existing product images in a pre-existing product database. From the pre-existing product database is then extracted the node in the taxonomy linked to the best matching image retrieved from the pre-existing product database. Then a second search is performed in which the query image is compared to pre-existing product images in the pre-existing product database that are indexed at the taxonomic node extracted previously. Then a number of pre-existing product images from the extracted taxonomic node are retrieved and ranked by mathematical distance from the query image. Lastly, the attribute data and the attribute value data linked to the "n" pre-existing product images returned are extracted.

The pre-existing product images may be matched to the query image based on a matching criterion selected from the group consisting of color histogram and edge detection histogram.

In yet another version of the method, the node in the taxonomy, the attribute data, and/or the attribute value data retrieved from the database are associated with the query image, and the query image and its associated data are then saved within the pre-existing product database at the associated node.

Yet another version of the method is specifically directed to a method to generate data describing a product. Here, the method comprises the following steps:

in a special-purpose computer or a suitably programmed general-purpose computer:

(a) comparing a digitized query image of the product to digitized pre-existing product images in a pre-existing product database, wherein the pre-existing product database comprises a taxonomy and an ontology, and the pre-existing product images are linked to a corresponding node in the taxonomy and also linked to attribute data and attribute value data in the ontology for each pre-existing product depicted in the pre-existing product images; then (b) retrieving at least one pre-existing product image that most closely matches the query image based on at least one matching criterion selected in whole or in part by a user; then (c) extracting from the pre-existing product database the node in the taxonomy, the attribute data, and the attribute value data linked to the pre-existing product image retrieved in step (b); then (d) associating the node in the taxonomy, the attribute data, and the attribute value data retrieved in step (b) with the query image; and then (e) saving the query image and its associated attribute data and attribute value data within the pre-existing product database at the associated node from step (d).

Yet another version of the method comprises, in a special-purpose computer or a suitably programmed general-purpose computer:

(a) comparing a digitized query image of the product to digitized pre-existing product images in a pre-existing product database, wherein the pre-existing product database comprises a taxonomy and an ontology, and the pre-existing product images are linked to a corresponding node in the taxonomy and also linked to attribute data and attribute value data in the ontology for each pre-existing product depicted in the pre-existing product images; then (b) retrieving at least one pre-existing product image that most closely matches the query image based on at least one matching criterion selected in whole or in part by a user; then (c) extracting from the pre-existing product database the node in the taxonomy linked to the pre-existing product image retrieved in step (b); then (d) comparing the query image to pre-existing product images in the pre-existing product database that are indexed at the taxonomic node extracted in step (c); then (e) retrieving and ranking by mathematical distance from the query image a number of pre-existing product images "n" from the taxonomic node extracted in step (c); then (f) extracting from the "n" pre-existing product images retrieved and ranked in step (e) the attribute data and the attribute value data linked to the "n" pre-existing product images; then (g) associating the node in the taxonomy, the attribute data, and the attribute value data retrieved in step (b) with the query image; and then (h) saving the query image and its associated attribute data and attribute value data within the pre-existing product database at the associated node from step (g).

BRIEF DESCRIPTION OF THE DRAWINGS

FIG. 2 is a view of the program when it first opens.

DETAILED DESCRIPTION OF THE INVENTION

Figure 1:
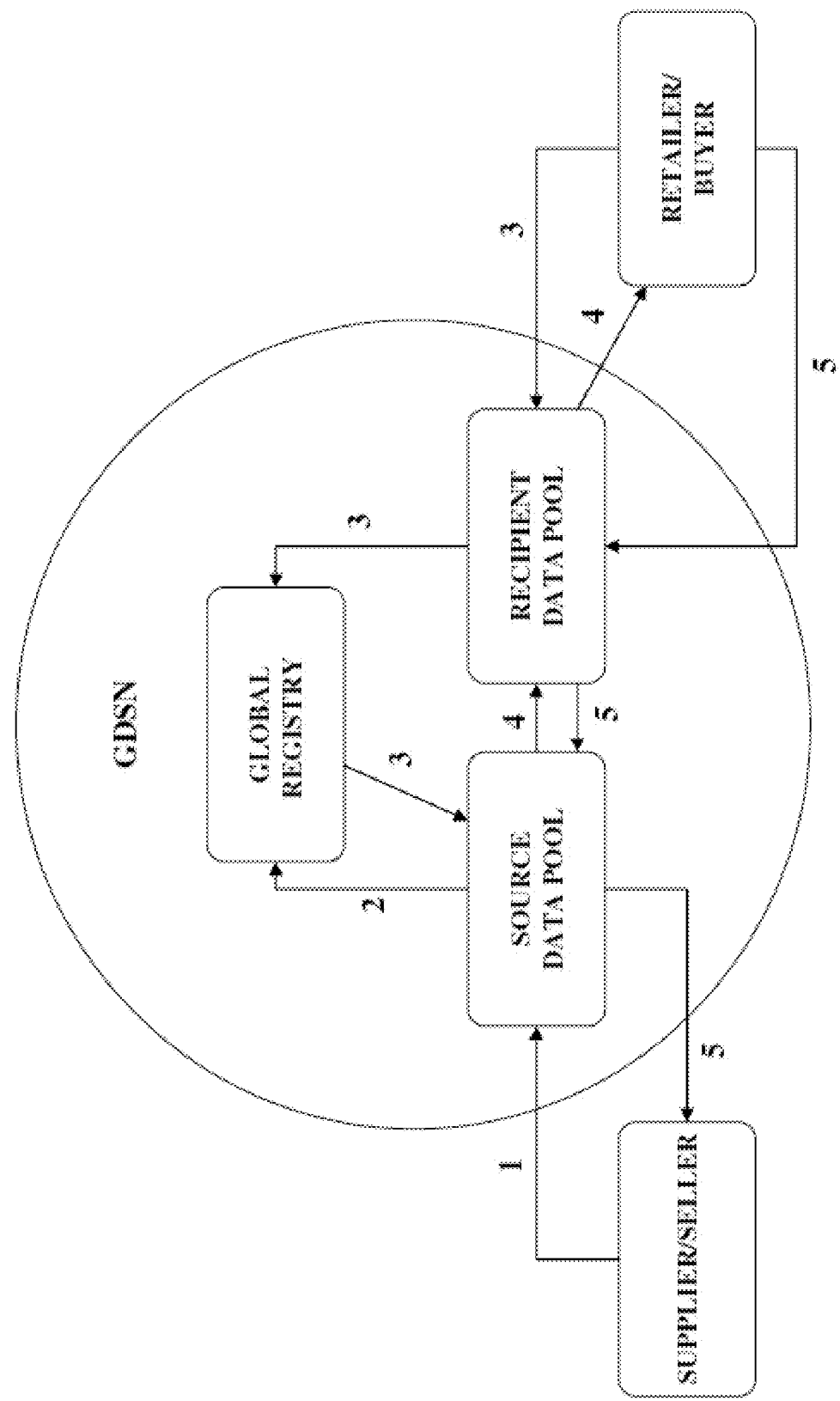
FIG. 1 (PRIOR ART) is a schematic diagram depicting the Global Data Synchronization Network (GDSN).

As shown in FIG. 1 (prior art), data pools are known and currently used in global commerce. These data pools comprise a database containing product identities, as well as corresponding product descriptions (i.e., attributes and attribute values) for each unique product in the database. The database is organized in a hierarchy. That is, the database contains a taxonomy and corresponding ontology to: (1) categorize the products themselves (i.e., the taxonomy); and (2)

define which attributes and attribute values are necessary to describe a product at a given node in the taxonomy (i.e., the ontology). To locate and characterize a product described in the registry, it must be properly located to a node in the taxonomy, and all of the attributes and attribute values must be fully and accurately recorded. As the quality of the data decreases (e.g., improperly categorized products, incorrect or missing attribute values, etc.), so too does the value and usefulness of the data pool. Thus, there is a huge incentive on the part of both Suppliers/Sellers and Retailer/Buyers to make sure that the data they submit to the data pool are of the highest quality possible. However, as noted previously, gathering the required data and entering it into a data pool is done entirely by manual labor—a tedious, time-consuming, and onerous task.

For purposes of the description that follows, certain assumptions are made about the product data within the database. First, it is assumed that the products described in the database are accurately linked to existing nodes in the taxonomy. Second, it is assumed that the database contains the appropriate attributes and attribute values for each product based upon where in the taxonomy the product description is linked. Third, it is assumed that the database includes at least one digital image of each product described in the database. Fourth, it is assumed that the digital image of each product is correctly linked to each product description at the product's proper node in the taxonomy. Thus, it is assumed that each product entry in the database is: (1) located at the correct node in the taxonomy; (2) includes a linked image of the product; and (3) includes a complete and accurate set of attributes and attribute values for the product.

The present invention is a method to automatically generate a complete or partial list of attributes and attribute values (data) for a new or existing product, a description of which is to be submitted to a product data pool. The method comprises comparing a digitized image of the new or existing product (the query image) to the product images in a pre-existing product database or data pool. (The terms database and data pool are used interchangeably herein.) One or more database images that most closely match the query image are then automatically retrieved from the pre-existing data pool, along with the corresponding attributes and attribute values that are associated with the selected database image(s). The corresponding attributes, attribute values, and taxonomy location associated with one or more of the retrieved database images are then extracted from the data pool and used to populate a new attribute and attribute value description of the product depicted in the query image. The extracted data is also used to automatically place the product depicted in the query image (and its associated attributes and attribute values) at the proper node within the taxonomy).

All of the steps described herein (extracting feature data, comparing features and images, retrieving images and their associated data, etc.) are performed using general purpose computers or other electronic processors specially programmed for the task, in conjunction with and ancillary data storage devices. The steps may also be performed by special purpose computers, processors, storage devices, and/or other logic devices and hardware that are designed and built from the outset to accomplish these tasks.

Comparing the query image to the product images in the pre-existing product data pool to find the most closely matching images in the data pool may be done by any means whatsoever, either now known or developed in the future. See, for example, U.S. Pat. No. 6,192,150, issued Feb. 20, 2001, to Leow et al., U.S. Pat. No. 6,529,635, issued Mar. 4, 2003, to Corwin et al., and U.S. Pat. No. 7,103,223, issued Sep. 5, 2006, to Crill, all of which are incorporated herein by reference.

Whatever image matching algorithm is selected, such algorithms usually share the following features (which generally function to reduce the computation complexity required to accurately match a query image to a pre-existing data pool containing a million or more unique images). First, informative features of the query image are gleaned or extracted from the digital query image. A "feature" is a block of data that is informative—it is a meaningful representation of the query image. A feature must be able to be algorithmically compared to the corresponding features of the images in the pre-existing database in order to determine a distance between the two images—i.e., in order to determine whether the feature of the query image is identical to or very closely related to the corresponding feature in any of the images in the database. The distance is a measure of how close or different the query image is from any of the images in the database. See below for a further discussion on distance.

Non-limiting examples of image features are, for example, the color histogram of an image and the edge detection histogram of an image. A color histogram is a representation of the distribution of colors in an image, derived by counting the number of pixels of each of given set of color ranges in a typically two-dimensional (2D) or three-dimensional (3D) color space. See below for a further discussion on color spaces. In short, a histogram is a standard statistical description of a distribution in terms of the frequency of different event classes occurring. For color, the event classes are regions in a defined color space. Color histograms are commonly used as an appearance-based signature to classify images for content-based image retrieval systems. By adding additional information to a global color histogram signature, such as spatial information, or by dividing an image into regions and storing local histograms for each of these areas, the signature for each image becomes increasingly robust. Similar to color histogram, edge detection histograms characterize sharp changes in intensity in an image. These sharp jumps in intensity typically occur at object boundaries. Thus, an edge detection histogram is useful for segmentation, registration, and identification of objects in a scene.

An edge is a jump in intensity. The cross section of an edge has the shape of a ramp. An ideal edge is a discontinuity (i.e., a ramp with an infinite slope). The first derivative assumes a local maximum at an edge. For a continuous image $f(x, y)$, where x and y are the row and column coordinates respectively, the two directional derivatives $\partial_x f(x, y)$ and $\partial_y f(x, y)$ are most informative. Of particular interest in edge detection are two functions that can be expressed in terms of these directional derivatives: the gradient magnitude and the gradient orientation. The gradient magnitude is defined as $|\nabla f(x, y)| = \sqrt{(\partial_x f(x,y))^2 + (\partial_y f(x,y))^2}$, and the gradient orientation is given by $\angle \nabla f(x, y) = \text{ArcTan}(\partial_y f(x, y)/\partial_x f(x, y))$. In short, these two parameters define the "sharpness" and "direction" of the edge, respectively. Local maxima of the gradient magnitude identify edges in $f(x, y)$. When the first derivative achieves a maximum, the second derivative is zero. For this reason, an alternative edge-detection strategy is to locate zeros of the second derivatives of $f(x, y)$. The differential operator used in these so-called zero-crossing edge detectors is the Laplacian: $\Delta f(x, y) = \partial_{(x,2)} f(x, y) + \partial_{(y,2)} f(x, y)$.

Once a feature is chosen for purposes of comparison, an index comprised of the set of corresponding features for each image in the repository is assembled. The selected feature is then extracted from the query image. The query image feature is then compared (algorithmically and automatically) to the feature index from the database images. The images and associated data of the closest matches are then retrieved automatically. Thus, for each feature set in the index, the distances between the feature of the query image and the feature from the index is calculated. By applying weighting values to each feature, the relative importance of each feature can be evaluated to determine its ability to retrieve closely matching images from the database. The relative distances of one or more features of all images in the repository may be compared (either singly or by means of weighting or averaging) to the corresponding features of the query image. The results are then sorted in order of distance, with the most closely matching imaged listed first and more distant matches listed in increasing order of distance. The closest images, the data associated with that image (attributes and attribute values), and the taxonomic location of the image are retrieved.

Thus, when faced with an image of a new version of an old product (for example, a new type of pad lock), the present method can also be used to determine where in the taxonomy the product image should be classified. To do so, an image comparison as described above is performed. The data associated with the top "n" known images that were retrieved from the database are then automatically queried as to where in the taxonomy the products reside that are linked to these images. The taxonomy node that occurs most often in the top "n" images (where "n" is an arbitrary number of database images that will be queried) is the most likely node where the product depicted in the query image should be located.

Because the method retrieves not just images, but also the product data associated with each retrieved image, the method can be used to automatically generate a list of attributes and likely attribute values for the product depicted in the query image. One way to make this automatic generation of attributes and attribute values for a new product to be more robust is to perform two searches. The first search compares the query image to the entire database to place the new product into its proper node in the taxonomy. A second search is then performed wherein the search is limited only to images that appear at the node where the new product is placed. After performing the second search, the top "n" closest matching images can be inspected manually in order to select a subset of the closest images to the query image. A query can then be performed against this subset of images to determine, for each attribute for each image retrieved from the database, how many times does each corresponding attribute value match the corresponding value of the other images in the subset. The results are then automatically sorted for each attribute to determine the attribute values that matched the most often. The attribute values that do not match more often than an arbitrarily selected threshold are not likely to apply to the product depicted in the query image. The top-most matching attributes and attribute values for each attribute that meets or exceeds the threshold are used to populate a corresponding attribute and attribute value entry for the product depicted in the query image.

A working example of the present process is depicted in FIGS. 2-9. The same reference numerals are used throughout the figures to designate corresponding features. FIGS. 2-9 depict screen shots of a program that executes the present method using three types of image feature data: color, shape, and texture. As can be seen in the figures, the relative importance of these three features is controlled by sliders 30, 32, and 34 at the upper center of each screen. Moving a slider to the right increases the relative importance of its respective feature. Moving a slider to the left decreases the relative importance of its respective feature.

Figure 2:
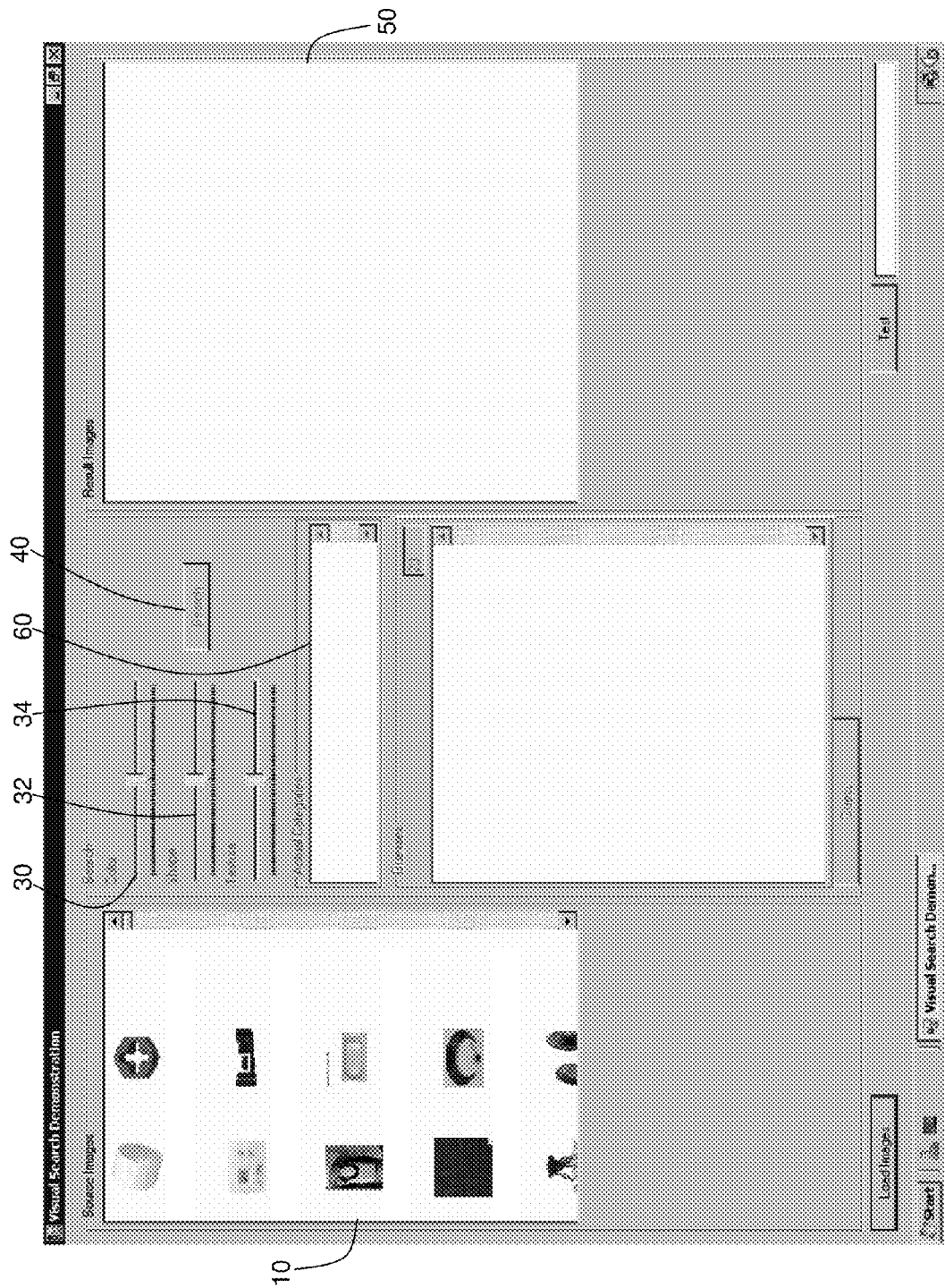
FIG. 2 depicts a screen shot of a program that executes the present method using three types of image feature data: color, shape, and texture.

Shown in FIG. 2 is a view of the program when it first opens. On the left is a series of exemplary query images 10 that have been loaded into the system to demonstrate the operation of the process. The program is linked to a database containing approximately 500,000 product images and the corresponding data associated with the products depicted in the images.

Figure 3:
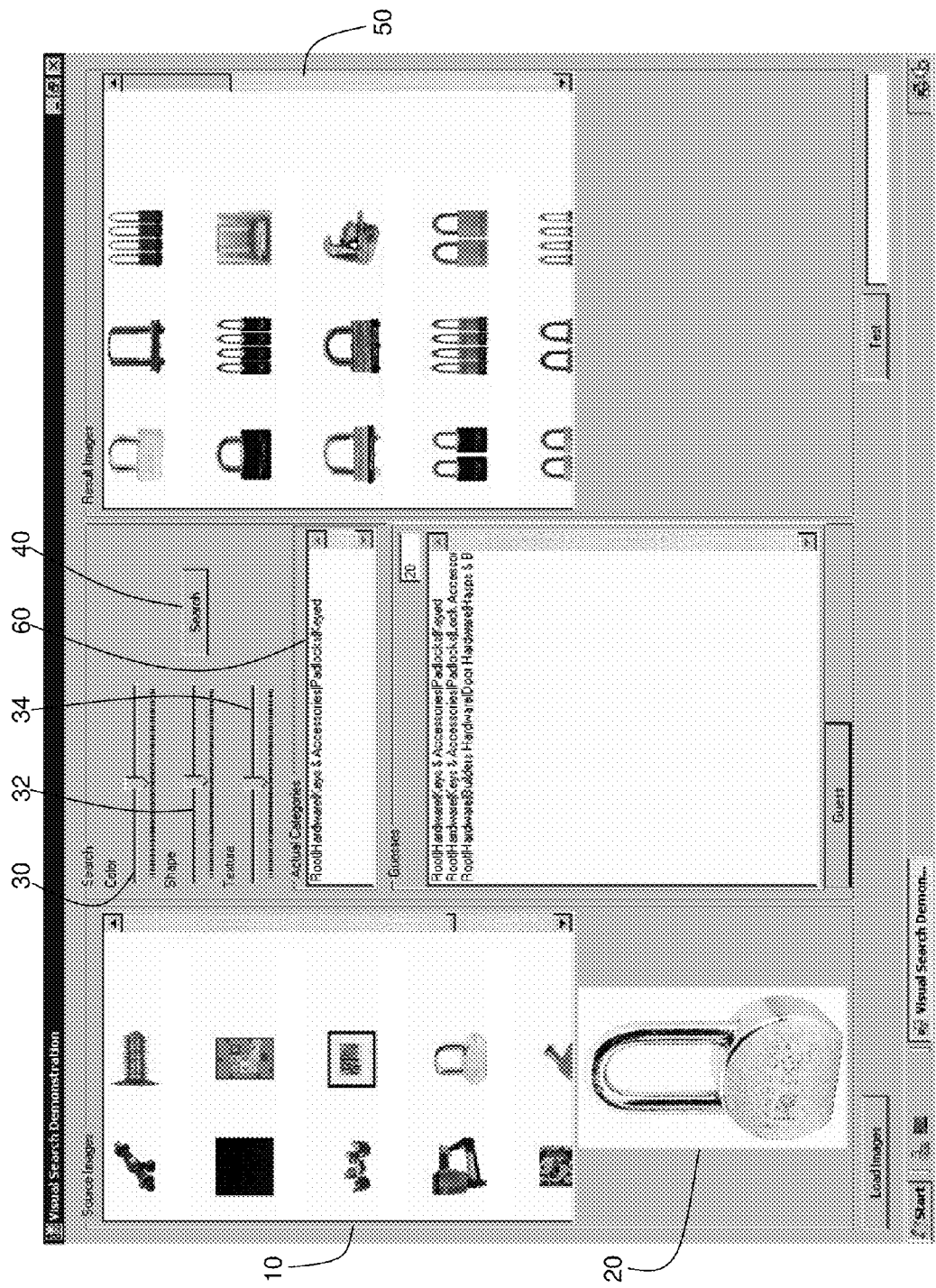
FIG. 3 depicts a first query of the program shown in FIG. 2 in which the query image is a keyed padlock (shown at the lower left of FIG. 3).

FIG. 3 depicts a first query 20 of the database using a keyed padlock as the query image, shown at the lower left of FIG. 3. Each of the three sliders 30, 32, and 34 are placed in the middle, so that color, shape, and texture are all given the same relative weight when comparing the query image to the images in the database. When the "search" button 40 is pressed, the program automatically retrieves and displays the closest matches on the right, in search result field 50 as well as the taxonomic locations of the retrieved images (shown in the center of the screen shot at 60). As can be seen in FIG. 3, using equal weighting of color, shape, and texture returned a very good match. The taxonomic entry of the closest matching image is "Root/Hardware/Keys & Accessories/Padlocks/Keyed. A very good match indeed!

Figure 4:
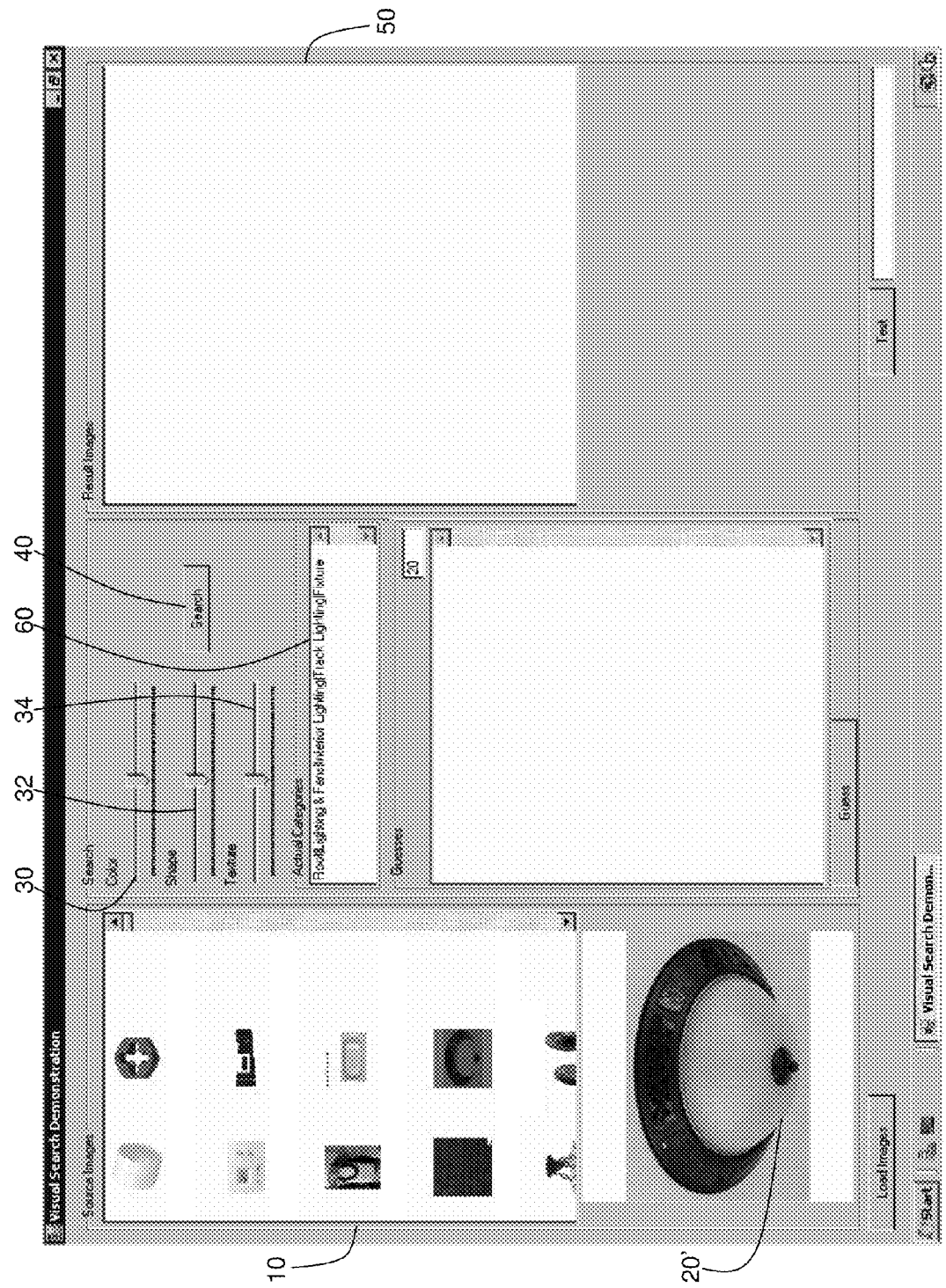
FIG. 4 depicts a second query using a ceiling lighting fixture as the query image. The query image is shown at lower left. The three sliders are all placed in the middle, thus assigning equal weight to color, shape and texture.
Figure 5:
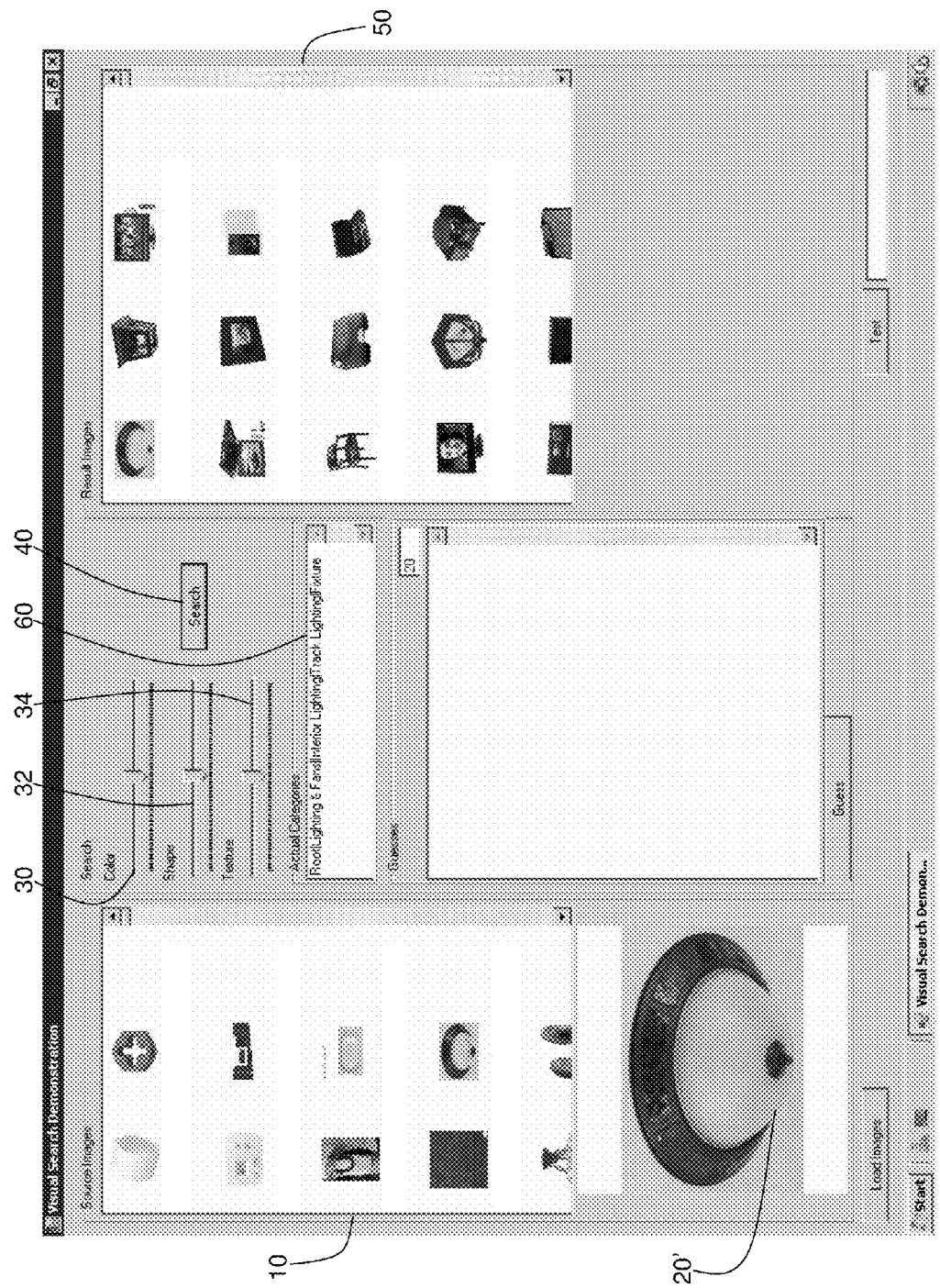
FIG. 5 depicts the results of the search shown in FIG. 4.

FIGS. 4-9 depict a similar search for a ceiling lighting fixture 20' wherein different relative weights were assigned to color, shape, and texture. FIG. 4 shows the initial selection of the query image 20', at lower left. The three sliders 30, 32, and 34 are all placed in the middle, thus assigning equal weight to color, shape and texture. The results of this search are shown in FIG. 5 in the search result field 50. As can be seen on the right-hand side of the screen shot, the image match is quite good. The taxonomic location retrieved (in field 60) is Root/Lighting/Interior Lighting/Track Lighting/Fixture.

Figure 6:
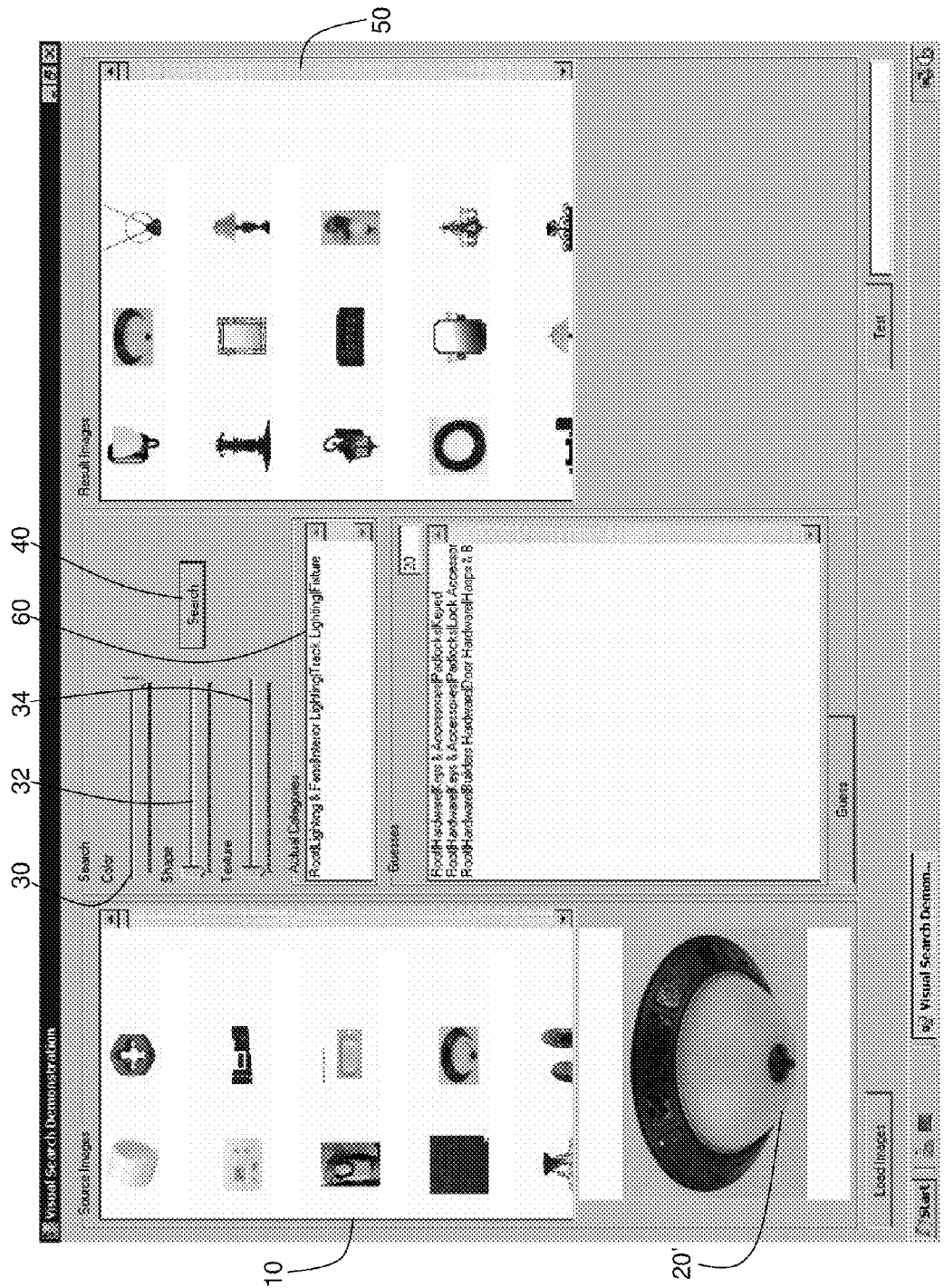
FIG. 6 depicts the same search as in FIG. 4, with the exception that color has been given the maximum weight, and shape and texture have been given the minimum weight.

FIG. 6 depicts the exact same search, with the exception that color slider 30 has been given the maximum weight, and shape 32 and texture 34 have been given the minimum weight. As can be seen by the images retrieved on the right, in field 50, while an exact match was found, it was not returned as the top image. The other returned images are also clearly quite distinct from the query image.

Figure 7:
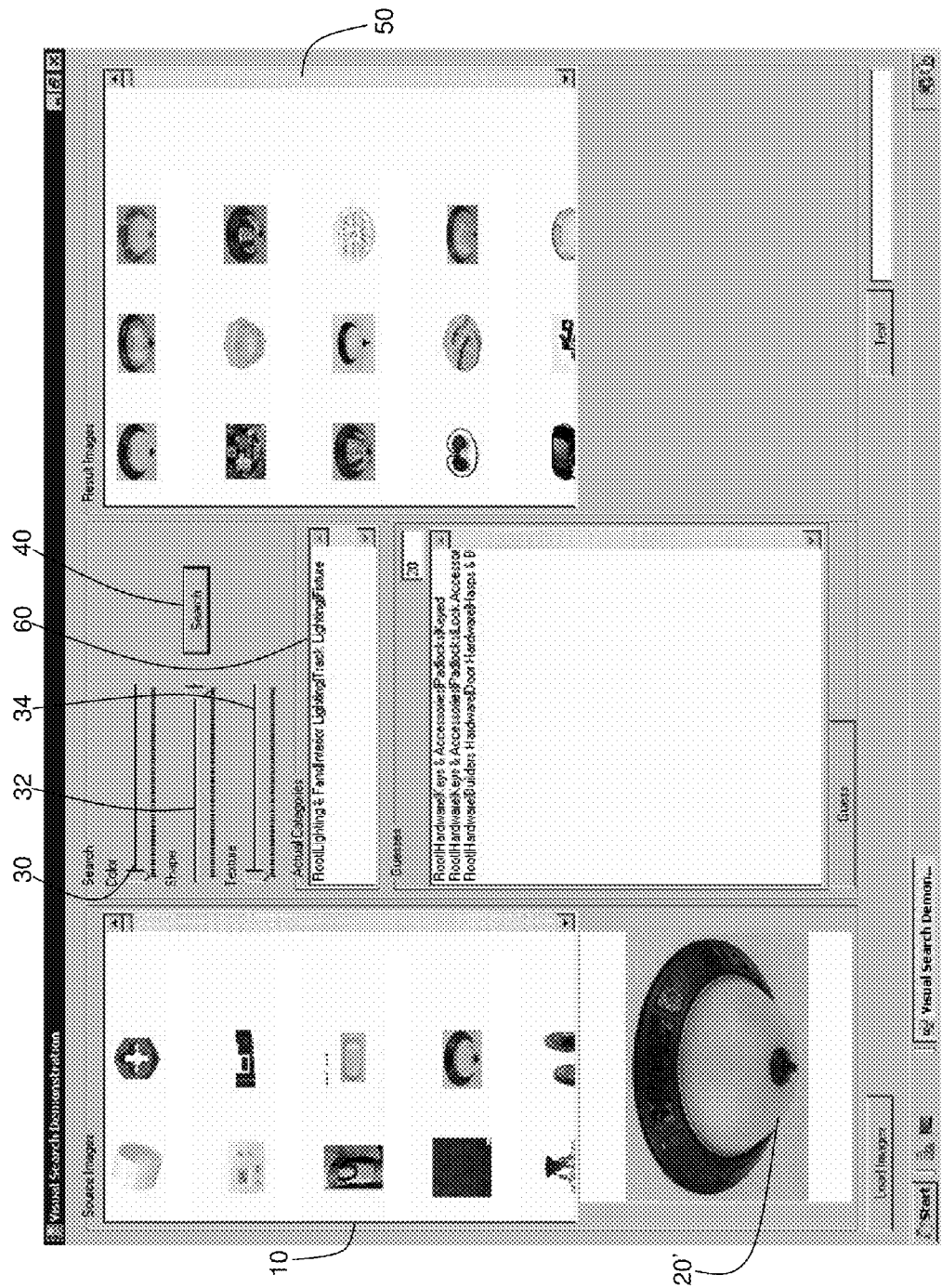
FIG. 7 depicts the same search as in FIG. 4, with the exception that shape has been given the maximum weight, and color and texture have been given the minimum weight.

FIG. 7 depicts the exact same search, with the exception that shape has been given the maximum weight as shown by slider 32 and color and texture have been given the minimum weight via the corresponding sliders 30 and 34. As can be seen by the images retrieved on the right of FIG. 7, in field 50, a host of very close matches were found based solely on the "shape" feature. Clearly the "shape" feature is very robust and informative when used with this particular query image.

Figure 8:
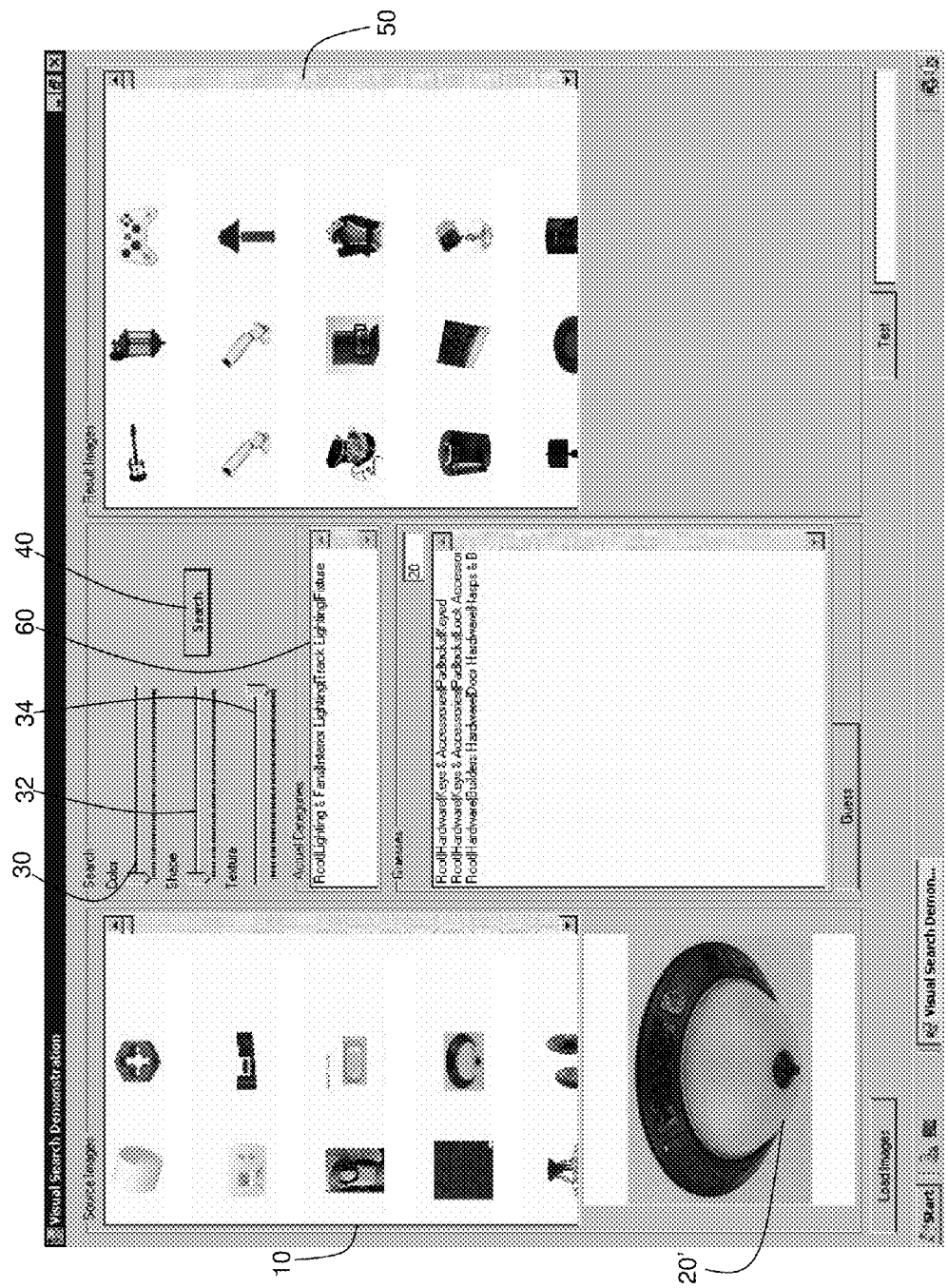
FIG. 8 depicts the same search as in FIG. 4, with the exception that texture has been given the maximum weight, and color and shape have been given the minimum weight.

FIG. 8 depicts the exact same search, with the exception that texture has been given the maximum weight via its slider 34, and color and shape have been given the minimum weight via the corresponding sliders 30 and 32. As can be seen by the images retrieved on the right side of FIG. 8, in field 50, using the color feature alone was not enough to retrieve any matching images. The retrieved images are vastly diverse, from an electric guitar to a coffee maker. Thus, with this particular query image, color histogram alone is insufficiently informative to retrieve images that match the product shown in the query image.

Figure 9:
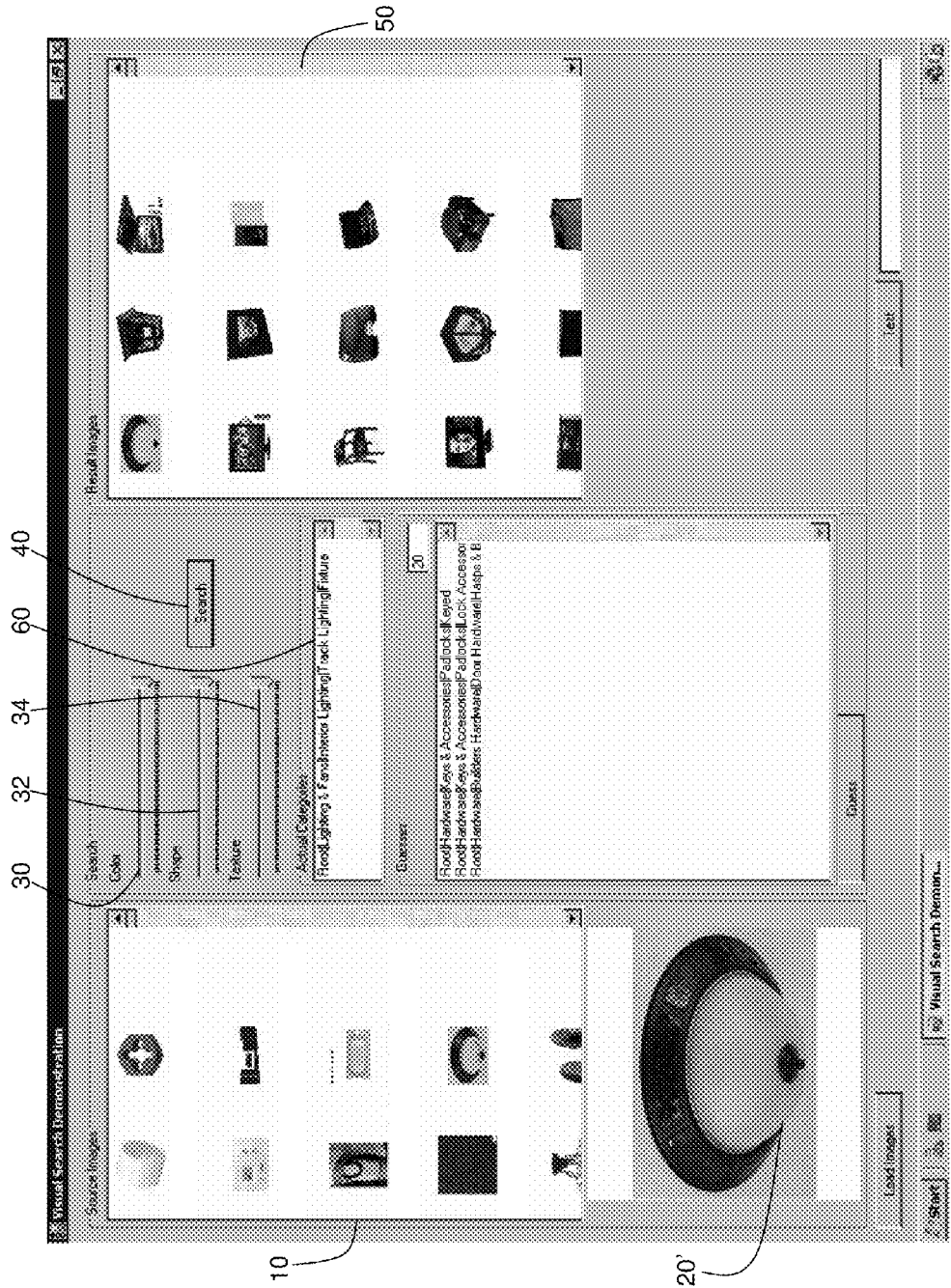
FIG. 9 depicts the same search as in FIG. 4, but with each of the color, shape and texture sliders set at maximum. Because the relative weight assigned to each feature is the same as in FIG. 4, the results too are substantially identical.

FIG. 9 is a repeat of the search shown in FIG. 4, but with all of the sliders 30, 32, and 34 pushed to the right. Because the relative weight assigned to each feature is the same as in FIG. 4, the results too are substantially identical, with only a minor change in the order of the returned images. See field 50.

Figure 10:
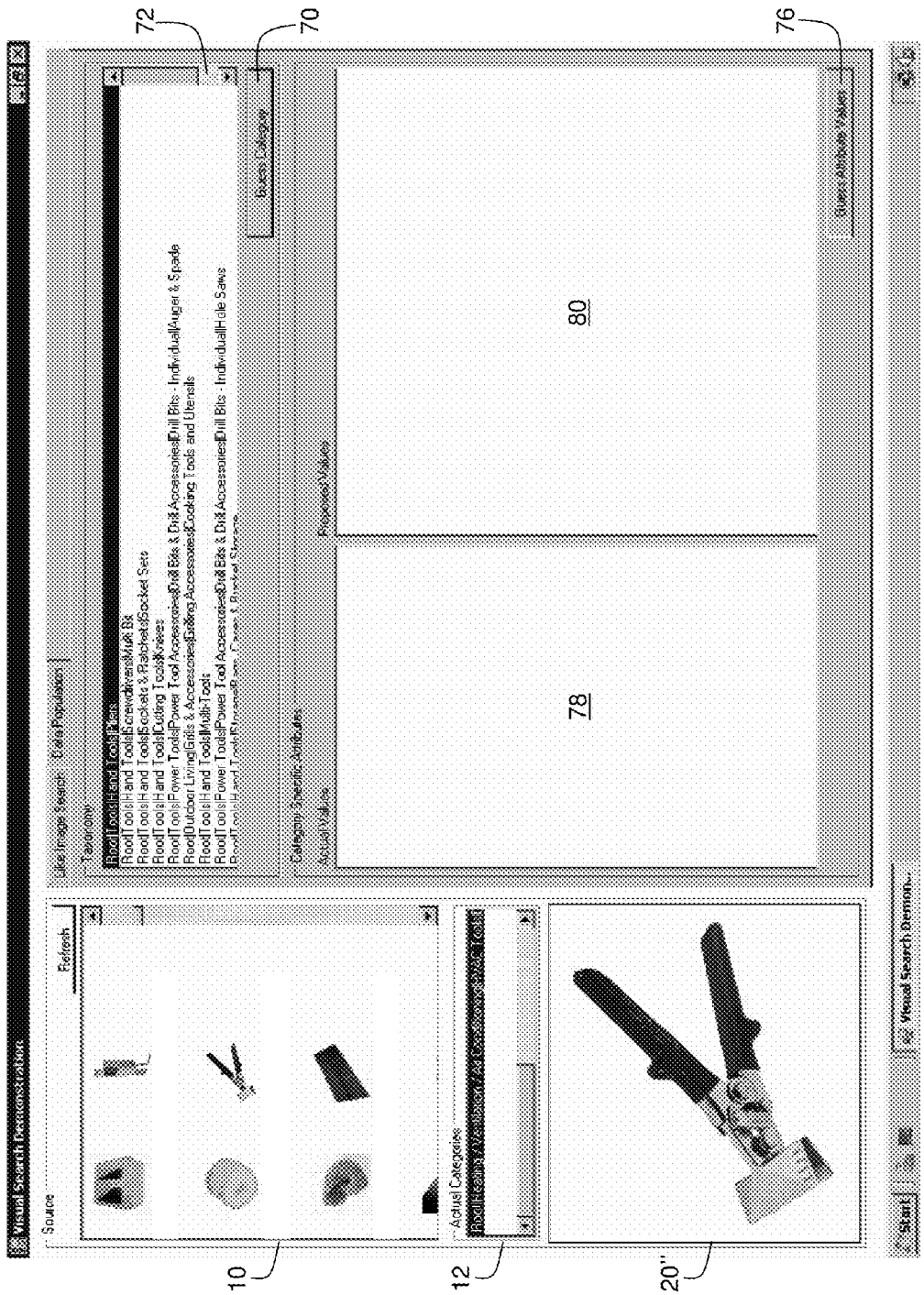
FIG. 10 depicts another version of the invention in which the query image and the matches returned by the method are used to auto populate the attributes and attribute values for a new product.
Figure 11:
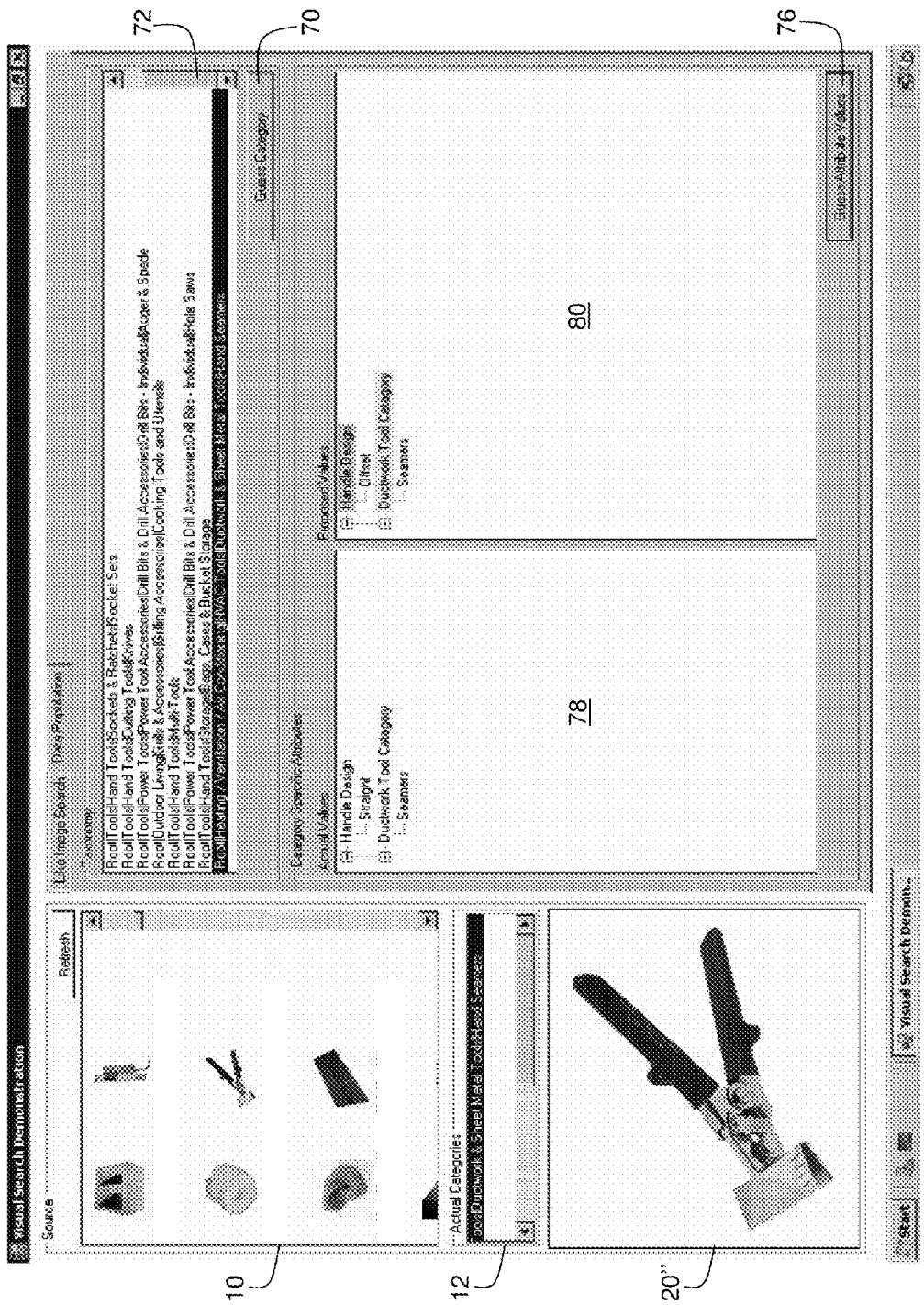
FIG. 11 depicts another view of the screen shot from FIG. 10 in which the true node where the hand seamer is located in the taxonomy is shown.

FIGS. 10 and 11 depict another version of the invention in which the query image and the matches returned by the method are used to auto populate the attributes and attribute values for a new product. FIG. 10 depicts a screen shot of a working version of the method. Here, the new products (i.e., query images) are listed in the upper left at 10. For testing purposes, these query images were taken from the pre-existing database, along with the node where each product is actually located in the taxonomy. The true node where each product is recorded is shown in the "actual category" box 12, at the middle left of FIG. 10. In FIG. 10, the query image 20" selected is a hand seamer (i.e., a tool used to join heating, ventilating and air-conditioning duct work). The node where this particular tool is located in the pre-existing database is "Root/Heating/Ventilation/Air Conditioning/HVAC Tools/ Ductwork & Sheet Metal Tools/Hand Seamers." See the middle left of FIG. 10, at field 12.

Extracting the color, shape, and texture features of the image 20" of FIG. 10, and selecting the "guess categories" button 70 at the upper right of FIG. 10 causes the program to return a list of possible nodes where the image might logically be located. The list of possible nodes is returned at the upper right of FIG. 10, in field 72. (Bear in mind, the program does not "know" the actual node where the product is located. The actual node for the query image (the hand seamer) is shown at 12 of FIG. 10 solely for confirmation purposes.) As can be seen from the lists in FIGS. 10 and 11, the program does return the proper node, but not as the first hit.

Scrolling through the list of possible nodes in field 72 reveals the true node, as shown at 74 in FIG. 11, where the true node where the hand seamer is currently located is highlighted. Going down to the lower right of the screen and clicking "Guess Attribute Values" 76 returns a list of attributes 78 and the values 80 for those attributes that are closest to the query image based solely on the feature data extracted from the query image. The proposed attributes may optionally be color-coordinated to reflect whether the returned attributes were exact matches with other products in the database, whether the existence of the attribute matched but its corresponding value did not match, etc.

Note that color, shape, and texture are only three exemplary features that may be used to compare query images to database images. As noted above, any image-matching method, feature, protocol, or algorithm, now known or developed in the future, may be used in the present invention. See the attached appendix for suitable methods.

Regarding color spaces, a color space (or color model) is a way of representing colors and their relationship to each other. A color space is essentially a multi-dimensional system and a subspace within that system where each color is represented by a single point or vector. Image processing and machine vision systems use several different color spaces including RGB (red, green blue), HSI (hue, saturation, intensity; also known as HSL—hue, saturation, luminosity), HSV (hue, saturation, value), CMY (cyan, magenta, yellow), and CMYK (cyan, magenta, yellow, black). The RGB, CMY, and CMYK color spaces function in essentially the same fashion, although RGB is "additive" and is used predominantly to calibrate color display monitors, while CMY is "subtractive," and is used extensively in the dye, pigment, and printing industries. (That is, RGB defines colors formed by adding light beams together, as in a monitor; CMY defines colors by the light reflected from the surface—and thus absorbed colors are subtracted to yield the final reflected color, as in printed or painted material.) The RGB color space will be described by way of example. In the RGB space, each color appears in its primary spectral components of red, green, and blue. This RGB color space is based on a Cartesian coordinate system. The RGB model is represented by a 3-dimensional cube with red, green, and blue at the edges of each axis. Each point in the cube represents a color, and the coordinates of that point represent the amount of red, green and blue components present in that color.

The Hue, Saturation, Intensity (HSI) or Hue, Saturation, Luminance (HSL) color space was developed to put color in terms that are easier for humans to quantify. The hue component is "color" in the conventional sense of the word; such as orange, green, violet, etc. (the ROY G. BIV mnemonic for the colors of the rainbow (red, orange, yellow, green, blue, indigo, violet) is one way of visualizing the full range of visible hues). Thus, hue represents the dominant color as perceived by an observer. Saturation refers to the amount or richness of color present. Saturation is measured by the amount of white light mixed with a hue. In a pure spectrum, colors are fully saturated. Colors such as pink (red and white) and lavender (purple and white) are less saturated. The intensity or light component refers to the amount of grayness present in the image.

Colors represented in HSI model space have certain advantages over colors represented in RGB or CMY model space. Most notably, HSI includes an intensity (luminance) component separate from the color information. Second, the intimate relation between hue and saturation more closely represents how humans actually perceive color. That being said, any of the color spaces now known or developed in the future, including RGB, CMY, CMYK, HIS and HSL, may be used in the present invention.

HSI is modeled with cylindrical coordinates. One possible model comprises the double cone model, i.e., two cones placed end to end or an inverted cone below another cone. For information on the double cone model, see Randy Crane, "A Simplified Approach to Image Processing," Prentice Hall, 1997. The hue is represented as the angle theta, varying from 0° to 360°. Saturation corresponds to the radius or radial distance, varying from 0 to 1. Intensity varies along the z-axis with 0 being black and 1 being white. When S=0, the color is gray scale, with intensity I, and H is undefined. When S=1, the color is on the boundary of the top cone base and is fully saturated. When I=0, the color is black and therefore H is undefined.

Another color space is informally referred to as "Lab" color space, but is more formally designated as CIELAB (or CIE L*a*b*) and a related "Lab" color space, "Hunter L, a, b." "Lab" color spaces are conventional and well-known, and therefore will not be described in any detail. Of particular note, unlike RGB and CMY, "Lab" color spaces were created to serve as a device-independent color model to be used as a reference. The three parameters in the "Lab" spaces represent the lightness of a color ("L*," L*=0 yields black and L*=100 indicates white), its position between magenta and green ("a*," negative values indicate green, positive values indicate magenta), and its position between yellow and blue ("b*," negative values indicate blue and positive values indicate yellow).

On the assumption that the R, G and B values have been normalized to range from 0 to 1 (which is conventional), the following equations may be used to convert from RGB color space to HSI (or HSL) color space:

$$H = \cos^{-1}\{(\tfrac{1}{2}[(R-G)+(R-B)]/([R-G]^2 + [R-B][G-B])^{0.5}\}$$

$$S = 1 - [3/(R+G+B)][\min(R,G,B)]$$

$$I = (R+G+B)/3$$

The Intensity I (or Luminance L) may also be represented by the equation:

$$L = 0.299R + 0.587G + 0.114B$$

which is a weighted sum of the RGB values.

The equation for H yields values in the interval [0° to 180°]. If B/I>G/I then H is greater than 180° and is obtained as H=360°−H.

Prior art in color machine vision systems use various techniques to measure and match colors. Those skilled in the art will be familiar with "thresholding" an image. To threshold a color image, a threshold is applied to each of the three planes that make up the image. In RGB mode, to select a particular color, one will need to know the red, green and blue values that make up the color. In RGB mode it is not possible to separate color from intensity. Therefore, a characterization algorithm such as histogram intersection based on RGB space will be intensity sensitive. For more information on this, please see Michael J. Swain, "Color Indexing," *International Journal of Computer Vision*, vol. 7:1, page 11-32, 1991.

U.S. Pat. No. 5,085,325 (Jones) describes a color sorting system and method. The method creates a lookup table containing a series of 0's (accept) and 1's (reject) based on good and bad sample images. During the sorting process, the pixel value of the input image is used to address the lookup table, the output of the lookup table is either 1 or 0. If the number of rejects (1's) accumulated is larger than a specified number K, the input image is rejected. This color sorting method is based on a pixel-by-pixel comparison. A large memory is required to store the lookup table. Although a special hardware addressing approach can improve the processing speed, the cost of computation is still very high for sorting objects with complex colors.

U.S. Pat. No. 5,751,450 (Robinson) provides a method for measuring the color difference of two digital images as a single "distance." This "distance" is an average of the color differences of all corresponding pixels of the two images. The cost of computing the "distance", however, is very high. This template image has to be stored in the computer memory for on-line color matching. If the size of the template and target image are not the same, special operations for alignment or resizing the image must be done before the matching process can begin. A further drawback of this approach is that it is impossible to have scale and rotation-invariant color matching based on the "distance" measure. See also U.S. Pat. No. 6,963,425.

The image color comparison used in the present method can be accomplished using any known color space system (such as those noted above).

In comparing the data sets between the query image and the pre-existing images in the database, it is preferred that the query image data set be compared to the database image data set by determining a minimum mathematical distance between the standard color set and the sample color data set. The database image color data set having the minimum mathematical distance from the query image color data set is then deemed to be the set of coordinates within the color space that most closely matches the query image. The minimum mathematical distance can be determined using any suitable metric, such as (without limitation) a Euclidean metric, a taxicab metric, or a Chebyshev metric.

The method can also be used to match patterns, in which case the sample colors are analyzed using a clustering algorithm to identify the pattern and the individual colors within the pattern. While any suitable clustering algorithm may be used, a fuzzy c-means clustering algorithm is generally preferred.

The normalized query image color data set is then compared to the database image color data sets to find the closest match or matches. To determine the color coordinates that most closely match the sample color, various similarity measures (mathematical operations) can be used to analyze the data. Regardless of the method chosen, they all share one common feature, which is the calculation of a mathematical distance measure between the query image color data and each set of color data for the database images that are considered. The distance measure is preferably expressed as a single numeric value, wherein the smaller the distance measurement, the closer the color match. The color coordinates within the database image color data sets are then sorted by their respective distance measures to the query image color data, and the coordinates that are closest (i.e., have the smallest distance value) from the query image coordinates are deemed to be the best color matches.

For the RGB measures below, it is assumed that the range of valid values for the R, G, and B channels are all the same as one another. For the RGB space, the conventional range for each coordinate is either [0, 255] or [0, 1]. Either range works equally well. As long as all three coordinates (R, G, and B) have the same value ranges, each coordinate contributes equally to the weighting.

The simplest distance measure considers the RGB values of the sample color and one control color, and the distance is calculated as the sum of the differences of each channel respectively. (This type of distance measure is known as a "Taxicab metric" or "Manhattan distance" and treats the R, G, and B, values in the same fashion as if they were spatial coordinates in Cartesian graph.) Thus, the sample color RGB values are designated R[s], G[s], and B[s], and the standard color data set RGB values are designated R[c], G[c], and S[c], then this distance measure is:

$$\text{Distance} = |R[s] - R[c]| + |G[s] - G[c]| + |B[s] - B[c]|.$$

The Chebyshev metric distance (also known as the "chess" distance because of its relationship to how a king moves in the game of chess) will also yield distance results similar to the taxicab metric. Chebychev distance measures the greatest of the differences between two points along any coordinate dimension.

Rather than a taxicab metric or a Chebychev metric, the Euclidian distance between the sample color and one or more color coordinates of the standard color data set may also be used. (Again, this approach treats RGB space as a Euclidian space; R, G, and B, are treated in the same fashion as the Cartesian coordinates X, Y, and Z.) This measure is defined as:

$$\text{Distance} = [(R[s] - R[c])^2 + (G[s] - G[c])^2 + (B[s] - B[c])^2]^{(1/2)}.$$

In the HSV color space, the distance may also be calculated using a weighting vector on the differences of the HSV values between the sample color and the control colors in the standard color data set. The standard HSV model uses a cylindrical coordinate system as opposed to the more common Euclidian (square) coordinates, so range normalization must be performed to obtain an appropriate distance measure. In the present invention, an HSV representation that allows the H (hue) values to range is [0, 360) (degrees); the S (saturation/vibrancy) and V (value/brightness) values range is [0, 1] can be used. These ranges are first normalized so they are all represented as values in [0, 100]. Thus, the range-normalized control color values are designated H[c], S[c], and V[c]; and the range-normalized sample colors values are designated H[s], S[s], and V[s]. The differences between the control and sample values for each value of H, S, and V can then be calculated as follows:

$$H\text{-delta} = |H[c] - H[s]|$$

$$S\text{-delta} = |S[c] - S[s]|$$

$$V\text{-delta} = |V[c] - V[s]|$$

While the HSV color representation is more intuitive in terms of how humans actually perceive color, each of the channels in HSV space contributes a different amount to color perception. The weighting vector is then used to calculate the final distance by placing a greater weight on hue, which is the primary perception made by the human eye and brain. This causes the different coordinates (H, S, and V) to count for different relative amounts in the distance measure. For example, to get the hue to count most and the saturation to count the least, a weighting vector of (10, 1, 5) is an appropriate weighting, and yields a distance measure of:

Distance=10*$H$-delta+1*$S$-delta+5*$V$-delta

Regardless of whether weighting is used or omitted (and both approaches are included in the present invention), the smallest distance measured is deemed to be the best color match.

When a multi-colored item is analyzed, the process of determining the "effective" colors is the same whether the analysis is for a control item, or a user image. Each pixel is normalized according to the color transformation functions in the same way as for single color analysis. But instead of determining a single average color, the normalized colors are "clustered" into a predefined number of representative colors. Any suitable clustering algorithm can be used; fuzzy c-means clustering is preferred. Other clustering algorithms or other variants on the fuzzy c-means clustering will yield similar results that can be interpreted similarly. If the item being analyzed is a control item, that is, the standard color data set itself is made from a collection of patterned physical color swatches, the list of most predominant colors is stored electronically and associated with the control item that was analyzed.

By way of an example, assume that the item to be color-matched included five main colors. The clustering would likewise be arranged to determine and compare the five most representative colors in the sample item to be color-matched. For a given sample item, assume that the representative RGB color vectors are:

<246, 191, 121>
<239, 182, 111>
<228, 171, 99>
<255, 207, 144>
<251, 198, 132>

This list of sample color coordinates it then to be compared with a standard color data set comprising the following list of color coordinate:

<235, 177, 106>
<249, 193, 121>
<246, 188, 116>
<241, 184, 111>
<254, 197, 128>

In the same fashion as single color matching, a distance measure is calculated between the sample color coordinate data and the standard color data set. One way to calculate these distance measures, is to pair the sample and control colors are and calculate a single color distance for each pairing. The overall distance measure is the average (arithmetic mean) of the individual distance measures. However, there are multiple ways to pair up the colors between the sample and control item. So, the pairing that yields the smallest distance measure is the best match, and is used as the distance measure between the control and sample.

Thus, for example, if the two data sets listed above are paired in the order listed above, and their differences calculated, the following results are obtained:

<246, 191, 121> <235, 177, 106> distance~=23.28
<239, 182, 111> <249, 193, 121> distance~=17.91
<228, 171, 99> <246, 188, 116> distance~=26.49
<255, 207, 144> <241, 184, 111> distance~=42.59
<251, 198, 132> <254, 197, 128> distance~=5.099

The average of those distances~=23.07

But this is only one possible pairing of the colors between the control and sample item. Other pairings may have better distance measures, so other pairings need to be evaluated. The following is the best pairing for these data:

<246, 191, 121> <246, 188, 116> distance~=5.83
<239, 182, 111> <241, 184, 111> distance~=2.82
<228, 171, 99> <235, 177, 106> distance~=11.57
<255, 207, 144> <254, 197, 128> distance~=18.89
<251, 198, 132> <249, 193, 121> distance~=12.24

The average of those distances~=10.27.

Regarding clustering, optimizing the clustering function yields better results with less computation time invested. Fuzzy c-means (FCM) is a method of clustering which allows one piece of data to belong to two or more clusters (i.e. on or more colors within the pattern between analyzed). (See J. C. Dunn (1973): "A Fuzzy Relative of the ISODATA Process and Its Use in Detecting Compact Well-Separated Clusters," *Journal of Cybernetics* 3: 32-57; and J. C. Bezdek (1981): "Pattern Recognition with Fuzzy Objective Function Algorithms," Plenum Press, New York.) Fuzzy c-means clustering is frequently used in pattern recognition. It is based on minimization of the following objective function:

$$J_m = \sum_{i=1}^{N} \sum_{j=1}^{C} u_{ij}^m \|x_i - c_j\|^2, \; 1 \le m < \infty$$

where m is any real number greater than 1, uij is the degree of membership of xi in the cluster j, xi is the ith of d-dimensional measured data, cj is the d-dimension center of the cluster, and ‖*‖ is any norm expressing the similarity between any measured data and the center.

Fuzzy partitioning is carried out through an iterative optimization of the objective function shown above, with the update of membership $u_{ij}$ and the cluster centers $c_j$ by:

$$u_{ij} = \frac{1}{\sum_{k=1}^{C}\left(\frac{\|x_i - c_j\|}{\|x_i - c_k\|}\right)^{\frac{2}{m-1}}}, \; c_j = \frac{\sum_{i=1}^{N} u_{ij}^m \cdot x_i}{\sum_{i=1}^{N} u_{ij}^m}$$

This iteration will stop when $$max_{ij}\{|u_{ij}^{(k+1)} - u_{ij}^{(k)}|\} < \varepsilon,$$

where ε is a termination criterion between 0 and 1, whereas k are the iteration steps. This procedure converges to a local minimum or a saddle point of $J_m$.

The algorithm comprises the following steps:

1. Initialize $U = [u_{ij}]$ matrix, $U^{(0)}$
2. At k-step: calculate the centers vectors $C^{(k)} = [c_j]$ with $U^{(k)}$ $$c_j = \frac{\sum_{i=1}^{N} u_{ij}^m \cdot x_i}{\sum_{j=1}^{N} u_{ij}^m}$$

3. Update $U^{(k)}$, $U^{(k+1)}$ $$u_{ij} = \frac{1}{\sum_{k=1}^{C} \left(\frac{\|x_i - c_j\|}{\|x_i - c_k\|}\right)^{\frac{2}{m-1}}}$$

4. If $\|U^{(k+1)} - U^{(k)}\| < \varepsilon$ then STOP; oterwise return to step 2.

Note, however, that the clustering process is only used when the user sample (the unknown to be matched) contains multiple colors, regardless of whether the physical swatch array contains multiple colors. The clustering is used to reduce the number of colors in the user sample down to a small number of colors, which is more meaningful (and feasible to process). Wood-grained finishes are a perfect example. When visually examining a wooden surface, there appears to be only a few colors within the grain. But in a digital image of stained wood, there are hundreds or even thousands of different RGB values reported across the entire length and width of the pixelated image. This is a result of many factors of digital imaging. But also, the human eye and brain together detect many, many colors, but perceptually reduces the number of colors "seen" down to a few colors. By using a clustering algorithm, the multitude of colors in the digital image can be made to be close to the few colors that human visual systems actually perceives in practice. Thus, the clustering algorithm is used to reduce the colors in the image down to the few "most predominant" colors within the digital query image.

Texture matching can be accomplished, for example, by the method of Leow & Lai, which is described in U.S. Pat. No. 6,192,150. Here, the matching method includes three main processing elements: a feature extractor, a feature transformer, and an image ranker 300.

A plurality of digitized images (e.g., pre-existing product images, query images, etc.) are initially fed into the feature extractor. Each image may contain a single texture pattern or multiple texture patterns.

The feature extractor identifies, in each image, regions that contain homogeneous texture patterns. Such texture patterns may have varying intensities, scales, and orientations. The feature extractor extracts a plurality of features that characterize each texture pattern which are collectively represented as a feature vector.

The feature transformer converts the extracted feature vectors output by the feature extractor to a representation that is invariant to intensity, scale, and orientation differences between like texture patterns. The image ranker then utilizes the feature representations output by the feature transformer to identify stored images which include at least one texture pattern which matches a query texture, and ranks such images in order of similarity to the query texture.

Regarding feature extraction, the feature extractor protocol generally includes a Gabor filter bank, a Gaussian filter bank, a normalization stage, and a region segmentation stage. The Gabor filter bank includes "N" Gabor filters, each of which has a different center spatial frequency $f_i$ and orientation $\theta_i$ for i=1, . . . , N, where "N" is a positive integer. The Gabor filters of the Gabor filter bank extract texture features at a plurality of spatial frequencies and orientations. It is preferred that the Gabor filters have overlapping filter supports so as to improve the robustness of the extracted features. Other features or operators that possess spatial frequency and orientation selectivity, such as oriented wavelets, may also be used.

The Gabor filters' energy outputs are fed into a bank of Gaussian filters having "N" oriented Gaussian filters. The Gaussian filters of the Gaussian filter bank remove noise and local variations introduced by the sinusoidal terms of the Gabor filters of the Gabor filter bank. The Gaussian filters generally have the same aspect ratios and orientations as the Gabor filters but larger scale parameters. Other smoothing filters besides Gaussian filters may also be used.

The outputs of the Gaussian filter bank are combined at the normalization stage as follows: the "N" filters' outputs at a particular pixel location (x,y) together form an N-component feature vector at that location. For each N-component feature vector at each pixel location, the components of the feature vector are normalized by dividing each component value by the value of the largest component. This normalization process removes variations due to intensity differences, thereby providing an intensity-invariant feature vector. The resulting normalized N-component feature vectors are thus utilized as extracted feature vectors for subsequent processing.

The extracted feature vectors from the normalization stage are fed to the region segmentation stage. The region segmentation stage groups neighboring feature vectors that are similar into the same regions. Similarity between feature vectors can be measured several ways, including the cosine of two vectors and the normalized Euclidean distance. During grouping, the region segmentation stage averages the feature vectors within each region to obtain an average feature vector for each region. After grouping, the region segmentation stage produces a list of the texture regions, and the average feature vector for each region.

The results produced by the region segmentation stage and the corresponding images may be stored in an image retrieval system such as described by T. S. Chua, S. K. Lim, and H. K. Pung in "Content-Based Retrieval of Segmented Images," *Proceedings of ACM Multimedia Conference*, pages 211-218, 1994. See also U.S. Pat. Nos. 5,579,471 and 5,751,286. These three references are incorporated herein by reference. During an image retrieval operation, a user may retrieve a desired image by selecting a query texture extracted from a digitized query image, which is then used to retrieve stored pre-existing product images stored in the database containing the query texture.

Regarding feature transformation, the feature transformer obtains the N-component feature vector of the query texture, and the N-component feature vectors extracted from the images stored in the image database. The feature transformer then transforms such N-component feature vectors into vector points in a D-dimensional intensity, scale, and orientation invariant texture space, where D is a positive integer.

Each dimension of the invariant texture space represents a texture characteristic salient to human perception such as structuredness, orientedness, and granularity. Initially, each N-component feature vector is arranged in a 2-dimensional representation. A first dimension of the 2-dimensional representation corresponds to spatial frequency, while the other dimension corresponds to orientation. In this 2-dimensional representation, texture characteristics are manifested as distinct patterns. For example, the N-component feature vector for a structured texture appears as a localized patch when arranged in the 2-dimensional space. The N-component feature vector for a texture with a high degree of orientedness appears as a column when arranged in the 2-dimensional space. The N-component feature vector with a high degree of granularity appears as a row when arranged in the 2-dimensional space. Vector component values may be presented graphically in any suitable fashion (e.g., darker shades for larger vector component values and lighter shades for smaller vector component values.)

The amount of each texture characteristic present in an N-feature vector which has been mapped to the 2-dimensional space can be measured by applying a template matching technique as follows: generate masks which detect various types of patterns, such as the patch-shaped, row-shaped, and column-shaped patterns described earlier; then apply a mask to each local region in the 2-D representation; and then compute the similarity values between the mask and the local region. The highest similarity value gives a measure of the amount of texture characteristic, corresponding to the mask, present in the feature vector. "D" texture characteristics are measured for a feature vector, one along each dimension of the texture space, and together form a D-component vector in the texture space.

Regarding image ranking, the D-component vectors of the query texture and texture patterns in the images are fed into the image ranker which computes the similarity between the query texture and each texture pattern in the stored images in the database. The preferred way to compute such a similarity is to calculate the Euclidean distance between the D-component vector of the query texture and the D-component vectors of the texture patterns in the pre-existing product images in the database. The smaller the Euclidean distance, the closer is the similarity. After computing the similarity in the D-dimensional texture space, the image ranker ranks the texture patterns in decreasing order of similarity.

The image ranker may also refine the ranking order as follows. Starting from the top of the ranking order, the image ranker computes the similarity between a texture pattern and "P" neighboring patterns down the rank list, where "P" is a small positive integer. The preferred measure of similarity is the normalized cosines of the N-component feature vectors of the texture patterns. Neighboring patterns that are more similar than other neighboring patterns are moved up in the ranking order. This procedure is repeated for every texture pattern in the ranked list.

After rank refinement, the ranked list of texture patterns is used to generate a ranked list of images by determining the images that contain the individual texture patterns. If an image appears more than once in the list, the instance with the highest ranking is retained and each other occurrence of the image in the list is removed. The image ranker then outputs the ranked list of images as the final output.

Query images may also be matched with pre-existing product images in the database via shape-matching. This can be done by a number of different methods, such as the shape-matching and compression protocol described in U.S. Pat. No. 6,529,635. Here, the query images and the images in the database are resolved into a plurality of shapes. Information indicating the size, location, orientation and shading of each of the shapes can then be used to compare the query image to the pre-existing product images in the database. (Because large numbers of pixels can potentially be encompassed within each shape, a correspondingly large compression factor can be achieved.)

An image encoder can be used to perform shape-based image compression and matching. The image encoder includes boundary determination logic, shape selection logic, shape positioning logic, and (optionally) transmitting logic.

A digitized image is initially input to the boundary determination logic which scans rows and columns of pixels in the image to detect abrupt changes in pixel color or intensity. These abrupt changes are called edge transitions because they often mark the edge of a feature in the image. The boundary determination logic performs curve-fitting analysis to fit adjacent edge transitions to curves. The curves, which may be straight lines or otherwise have any number of inflections, are associated with one another based on points of intersection to define image regions. These region definitions are then supplied to the shape selection logic.

The boundary determination logic may also associate color information with each identified region. For example, the color of a region, a color gradient, and a texture may be identified and recorded in the region definition. The color, color gradient and texture of a region are referred to collectively as "shading information." Generally, a color gradient may be identified based on the first derivative of the color with respect to pixel position. If the first derivative is constant or nearly so, then a gradual change in color occurs from one side of the image to the other. A texture may be identified as described previously or be based on the second derivative of the color with respect pixel position. If the second derivative is constant or nearly so, then the region is said to have a texture. The texture may be specified, for example, by a sample of the region or by an analytical expression describing the pattern of colors.

The shape selection logic uses the region definitions supplied by the boundary determination logic to identify a representative shape in a shape bank. The shape bank contains individual images associated with indices called "shape indices." Each individual image is made up of pixel values in a different geometric arrangement so that the shape selection logic can perform pattern-matching analysis to identify shapes in the shape bank that, by one or more criteria, most closely match the query image regions. For example, if an image region is defined by straight line boundaries, the number of boundaries can be used to classify the region as a triangle, quadrilateral or other polygon. Further, the angles at which the straight line boundaries intersect can be used to determine, in the case of a quadrilateral for example, whether the region is a parallelogram, rectangle, square, trapezoid, and so forth. Other, less well-defined shapes such as hand tools, appliances, and the like may also be recognized.

Pattern matching involves statistical analysis to determine a measure of difference between a region and one or more shapes in the shape bank. The shape in the shape bank that is least statistically different from the region and which does not differ from the region by more than a threshold value, is selected to represent the region. The shape selection logic preferably normalizes each region received from the boundary determination logic to adjust the region's size and orientation before performing pattern matching analysis.

If no shape is found that adequately matches a given region, a shape based on the region definition may be added to the shape bank. In this fashion, the shape bank can be continuously updated and refreshed. If electronic storage space is limited, the shape bank can be prevented from growing too large by overwriting the least recalled shapes with new shapes.

The shape selection logic stores a shape index in each region definition for which a shape is identified. The shape index corresponds to the identified shape and is then used for matching purposes.

Based on the region definitions and associated shape indices, the shape positioning logic generates shape definitions that include shape indices and construction parameters that can be used to construct the shapes in an output image. According to one embodiment, the construction parameters vary from shape to shape but typically include position information to indicate a position in the image at which the shape is to appear, size information to indicate the size of the shape and, if necessary, orientation information to indicate the orientation of the shape in the image. Position information may be specified, for example, by the starting point of an edge of the shape, or by a center point or focal point. Size information may be specified, for example, by starting and ending points of one or more edges in the shape, or by one or more radii. Orientation information may be specified by a starting and ending point of an edge of the shape or by the location of focal points in the shape. In one embodiment, coordinates of features in a shape such as the starting and ending points of a shape edge are given with respect to an x, y coordinate system having an origin at the upper left corner of the image. Other frames of reference may also be used.

The transmitting logic receives the shape definitions from the shape positioning logic and transmits the information to a recipient device. As discussed below, the shape definitions may be ordered for transmission so that shapes which are underneath other shapes are transmitted first. According to one embodiment of the encoder, the boundary determination logic, shape selection logic, shape positioning logic, and transmitting logic are at least partially implemented by a programmed processor in a general purpose computer. The transmitting logic may include hard-wired components necessary to transmit the compressed image data via a computer network (e.g., a modem or an area network card). The boundary determination logic, shape selection logic, and shape positioning logic may also include hard-wired components.

In a particularly preferred version of the invention, the images in the pre-existing product database are standardized (i.e., normalized and "cleaned up") to improve the accurate matching of query images to pre-existing product imaging. Thus, it is preferred that all images in the pre-existing product database be cropped/resized to selected pixel size (for example, between about 800 to 1000 pixels per side). This is just an arbitrary range. Any suitable pixel size/resolution can be selected based on the user's own considerations, such as the computational power and storage size available. The pre-existing product images (as well as the digitized query images) are preferably depicted on a uniform background, such as white or black background. These steps help to remove extraneous regions from the images that are not directly related to the product depicted in the image.

The various features of the query image (as described above) are then compared to the corresponding features of the images of the pre-existing products in the database. The feature data in the pre-existing product database is preferably regularly updated as new products are added to the database. Typical features that are compiled into an index within the database may include (among others), general shape, dominant colors, general texture, edge density and distribution, etc.

Other means of imaging matching, such as the method described in U.S. Pat. No. 7,103,223, may also be used in the subject method.

Additionally, the various image-matching descriptors from standards such as MPEG-7 may also be used. The MPEG-7 standard includes a number of visual descriptors, including descriptors for color, texture, shape, motion, localization, and face recognition. Any of these, or any combination of these, can be used in the present method to match query images to images contained in the pre-existing database. Several of these descriptors will be briefly described herein. More information on each descriptor used in the MPEG-7 standard is available from the Motion Picture Experts Group (online at http://mpeg.chiariglione.org, or via post: Dr. Leonardo Chiariglione, CEDEO.net, Via Borgionera, 103, I-10040 Villar Dora (TO), Italy). The complete MPEG-7 standard can be purchased from the International Organization for Standardization (ISO), on-line at http://www.iso.org/iso/home.html, or by post: ISO, 1, ch. de la Voie-Creuse, Case postale 56 CH-1211 Geneva 20, Switzerland.

In MPEG-7 there are five basic structures: the grid layout, the time series, kultiple view, the spatial 2D coordinates, and temporal interpolation.

The grid layout is a splitting of the image into a set of equally sized rectangular regions, so that each region can be described separately. Each region of the grid can be described in terms of other descriptors such as color or texture. Furthermore, the descriptor allows assignment of sub-descriptors to each rectangular area, or to an arbitrary subset of rectangular regions. (By analyzing only a subset of rectangular regions, computational effort required to match images can be reduced.)

The time series descriptor defines a temporal series of descriptors in a video segment and provides image to video-frame matching and video-frames to video-frames matching functionalities. This is useful if the query image is a digital video, rather than a still image. Two types of time series are available in MPEG-7: "RegularTimeSeries" and "IrregularTimeSeries." In the RegularTime Series, descriptors locate regularly (with constant intervals) within a given time span. This enables a simple representation for the application that requires low complexity. On the other hand, descriptors locate irregularly (with various intervals) within a given time span in IrregularTimeSeries. This enables an efficient representation for the application that has the requirement of narrow transmission bandwidth or low storage capability.

The 2D/3D descriptor specifies a structure which combines 2D descriptors representing a visual feature of a 3D object seen from different view angles. The descriptor forms a complete 3D view-based representation of the object. Any 2D visual descriptor, for example contour-shape, region-shape, color or texture can be used. The 2D/3D descriptor supports integration of the 2D descriptors used in the image plane to describe features of the 3D (real world) objects. The descriptor allows the matching of 3D objects by comparing their views, as well as comparing pure 2D views to 3D objects.

The spatial 2D coordinates descriptor defines a 2D spatial coordinate system. The coordinate system is defined by a mapping between an image and the coordinate system. One of the advantages using this descriptor is that MPEG-7 descriptions need not to be modified even if the query image size is changed or a part of the query image is clipped. In this case, only the description of the mapping from the original image to the edited image is required.

It supports two kinds of coordinate systems: "local" and "integrated." In a "local" coordinate system, the coordinates used for the calculation of the description are mapped to the current coordinate system applicable. In an "integrated" coordinate system, each image (frame) of a video may be mapped to different areas with respect to the first frame of a shot or video. The integrated coordinate system can for instance be used to represent coordinates on a mosaic of a video shot.

There are seven color descriptors used in the MPEG-7 standard: color space, color quantization, dominant colors, scalable color, color layout, color-structure, and GoF/GoP color.

Color space is the descriptor to be used in other color-based descriptions. In the current MPEG-7, the following color spaces are supported: R,G,B; Y,Cr,Cb; H,S,V; HMMD; Linear transformation matrix with reference to R, G, B; and Monochrome The color quantization descriptor defines a uniform quantization of a color space. The number of bins which the quantizer produces is configurable, such that great flexibility is provided for a wide range of applications. For a meaningful application in the context of MPEG-7, this descriptor has to be combined with dominant color descriptors, e.g. to express the meaning of the values of dominant colors.

The Dominant color(s) descriptor is most suitable for representing local (object or image region) features where a small number of colors are enough to characterize the color information in the region of interest. Whole images are also applicable, for example, flag images or color trademark images. Color quantization is used to extract a small number of representing colors in each region/image. The percentage of each quantized color in the region is calculated correspondingly. A spatial coherency on the entire descriptor is also defined, and is used in similarity retrieval.

Scalable Color is a color histogram in HSV color space, which is encoded by a Haar transform. Its binary representation is scalable in terms of bin numbers and bit representation accuracy over a broad range of data rates. The scalable color descriptor is useful for image-to-image matching and retrieval based on color feature. Retrieval accuracy increases with the number of bits used in the representation.

Color Layout represents the spatial distribution of color of visual signals in a very compact form. This compactness allows visual signal matching functionality with high retrieval efficiency at very small computational costs. It provides image-to-image matching as well as ultra high-speed sequence-to-sequence matching, which requires so many repetitions of similarity calculations. It also provides very friendly user interface using hand-written sketch queries since this descriptors captures the layout information of color feature. There are several notable advantages of the color layout descriptor:

There is no dependency on image/video format, resolutions, or bit-depths. The descriptor can be applied to any still pictures or video frames even though their resolutions are different. It can be also applied both to a whole image and to any connected or unconnected parts of an image with arbitrary shapes.

The required hardware/software resources for the descriptor are very small. It needs as few as 8 bytes per image in the default video frame search, and the calculation complexity of both extraction and matching is very low. It is feasible to apply this descriptor to mobile terminal applications where the available resources is strictly limited due to hardware constraints.

The captured feature is represented in a frequency domain, so that users can easily introduce perceptual sensitivity of human vision system for similarity calculation.

It supports scalable representation of the feature by controlling the number of coefficients enclosed in the descriptor. The user can choose any representation granularity depending on their objectives without interoperability problems in measuring the similarity among the descriptors with different granularity. The default number of coefficients is 12 for video frames while 18 coefficients are also recommended for still pictures to achieve a higher accuracy.

The color structure descriptor is a color feature descriptor that captures both color content (similar to a color histogram) and information about the structure of this content. Its main functionality is image-to-image matching and its intended use is for still-image retrieval, where an image may consist of either a single rectangular frame or arbitrarily shaped, possibly disconnected, regions. The extraction method embeds color structure information into the descriptor by taking into account all colors in a structuring element of 8×8 pixels that slides over the image, instead of considering each pixel separately. Unlike the color histogram, this descriptor can distinguish between two images in which a given color is present in identical amounts but where the structure of the groups of pixels having that color is different in the two images. Color values are represented in the double-coned HMMD color space, which is quantized non-uniformly into 32, 64, 128 or 256 bins. Each bin amplitude value is represented by an 8-bit code. The color structure descriptor provides additional functionality and improved similarity-based image retrieval performance for natural images compared to the ordinary color histogram.

The Group of Frames/Group of Pictures color descriptor (GoF/GoP color) extends the scalable color descriptor that is defined for a still image to color description of a video segment or a collection of still images. An additional two bits allows to define how the color histogram was calculated, before the Haar transfor is applied to it: by average, median or intersection. The average histogram, which refers to averaging the counter value of each bin across all frames or pictures, is equivalent to computing the aggregate color histogram of all frames and pictures with proper normalization. The Median Histogram refers to computing the median of the counter value of each bin across all frames or pictures. It is more robust to round-off errors and the presence of outliers in image intensity values compared to the average histogram. The intersection histogram refers to computing the minimum of the counter value of each bin across all frames or pictures to capture the "least common" color traits of a group of images. Note that it is different from the histogram intersection, which is a scalar measure. The same similarity/distance measures that are used to compare scalable color descriptions can be employed to compare GoF/GoP color descriptors.

There are three texture descriptors in MPEG-7: homogeneous texture, edge histogram, and texture browsing.

Homogeneous texture has emerged as an important visual primitive for searching and browsing through large collections of similar looking patterns. An image can be considered as a mosaic of homogeneous textures so that these texture features associated with the regions can be used to index the image data. For instance, a user browsing an aerial image database may want to identify all parking lots in the image collection. A parking lot with cars parked at regular intervals is an excellent example of a homogeneous textured pattern when viewed from a distance. The homogeneous texture descriptor provides a quantitative representation using 62 numbers (quantified to 8 bits each) that is useful for similarity retrieval. The extraction is done as follows; the image is first filtered with a bank of orientation and scale tuned filters (modeled using Gabor functions) using Gabor filters. The first and the second moments of the energy in the frequency domain in the corresponding sub-bands are then used as the components of the texture descriptor. The number of filters used is 5×6=30 where 5 is the number of "scales" and 6 is the number of "directions" used in the multi-resolution decomposition using Gabor functions. An efficient implementation using projections and 1-D filtering operations exists for feature extraction. The homogeneous texture descriptor provides a precise quantitative description of a texture that can be used for accurate search and retrieval in this respect. The computation of this descriptor is based on filtering using scale and orientation selective kernels.

The texture browsing descriptor is useful for representing homogeneous texture for browsing type applications, and requires only 12 bits. It provides a perceptual characterization of texture, similar to a human characterization, in terms of regularity, coarseness and directionality. The computation of this descriptor proceeds similarly as the homogeneous texture descriptor. First, the image is filtered with a bank of orientation and scale tuned filters (modeled using Gabor functions); from the filtered outputs, two dominant texture orientations are identified. Three bits are used to represent each of the dominant orientations. This is followed by analyzing the filtered image projections along the dominant orientations to determine the regularity (quantified to 2 bits) and coarseness (2 bits×2 bits). The second dominant orientation and second scale feature are optional. This descriptor, combined with the homogeneous texture descriptor, provide a scalable solution to representing homogeneous texture regions in images.

The edge histogram descriptor represents the spatial distribution of five types of edges, namely four directional edges and one non-directional edge. Since edges play an important role for image perception, it can retrieve images with similar semantic meaning. Thus, it primarily targets image-to-image matching, especially for natural images with non-uniform edge distribution. In this context, the image retrieval performance can be significantly improved if the edge histogram descriptor is combined with other descriptors such as the color histogram descriptor.

MPEG-7 uses three shape descriptors: region shape, contour shape, and shape 3D.

The shape of an object may comprise either a single region or a set of regions as well as some holes or voids in the object (e.g., a donut). The region shape descriptor makes use of all pixels constituting the shape within a frame. Thus, it can describe any shape, i.e. not only a simple shape with a single connected region, but also a complex shape that include holes in the object or several disjointed regions. The region shape descriptor not only can describe such diverse shapes efficiently in a single descriptor, but is also robust to minor deformation along the boundary of the object. The region shape descriptor is also characterized by its small size, fast extraction time and matching. The data size for this representation is fixed to 17.5 bytes. The feature extraction and matching processes are straightforward to have a low order of computational complexity.

The contour shape descriptor captures characteristic shape features of an object or region based on its contour. It uses curvature scale-space representation, which captures perceptually meaningful features of the shape. This representation has a number of important properties, namely: It captures very well characteristic features of the shape, enabling similarity-based retrieval. It also reflects properties of the perception of human visual system and offers good generalization. It is robust to non-rigid motion. It is robust to partial occlusion of the shape. It is robust to perspective transformations, which result from the changes of the camera parameters and are common in images and video. It is computationally compact.

Considering the continuous development of multimedia technologies, virtual worlds, and augmented reality, 3D contents become a common feature of today information systems. The 3D shape descriptor of MPEG-7 provides an intrinsic shape description of 3D mesh models. It exploits local attributes of the 3D surface.

The above-described image-matching methods are exemplary means for image comparison and ranking. The descriptions are not exclusive. Any image matching, comparison, and ranking methods now known in the art or developed in the future may be used in the present invention.

In the preferred version of the present invention, different pieces of information may be requested from the product database in response to submitting the query image. For example, the method can return similar images. In short, the system can be programmed simply to return images (and their associated product data) that most closely resemble the query image (based on the matching criteria selected by the user.) The system may also be programmed to return a suggested category or node where the product depicted in the query image should be placed within the database's product taxonomy. The system may also return suggested attribute fields and attribute values that are appropriate for the product depicted in the query image.

When a query image is submitted, it is generally preferred that the query image is normalized and "cleaned up" in the same fashion as the images of the pre-existing products in the product database. This increases the accuracy of the method in returning images that match the query image.

When the query image is submitted for matching, the program scans all (or a portion) of the images in the product database and calculates relative and/or weighted distances between the query image and the database images. The database images are the sorted based on this distance. The method then returns to the user those database images that have the shortest mathematical distance from the query image.

To return suggested nodes or categories into which the query image should be placed, the system again orders the database images in terms of shortest mathematical distance from the query image. The system then extracts from the closest images categories or nodes in which the depicted products are currently located. Attributes and attribute values are returned by the same mechanism. For example, the program may be programmed to select the most likely category or node (based on either the mathematical distance between the query image and the database images, and/or a user-provided category [e.g., upright vacuum cleaners]) and then search solely for images within that category or node to find the most similar images. The preferred method focuses on features that visually define key, user-defined attributes of the product depicted. For instance, if the program is asked to construct an attribute related to color or texture, it will focus on those features (just as it would focus on shape) for attributes that it determines are related to the shape of the product depicted in the query image.

The algorithms required to return a proposed node into which the query image should be logically placed can be simplified, in part, by imposing certain logical constraints based on known characteristics of the images in the pre-existing product database. For example, the database images can be analyzed for the description of a given attribute, the domain of possible and existing attribute values for a given attribute, how many nodes the attribute is linked to, etc. Some attributes have only two possible attribute values: yes or no. (For example, does a given refrigerator model have an ice-maker?) Other attributes, such as color, can have a massive range of attribute values. Some attributes and their entire range of associated values have no relevance to the appearance of a product (for example attributes such as "Has Product Manual" or "Has Extended Warranty.") Thus, in many instances, it can be assumed that if an attribute is linked to several nodes in the taxonomy that do not have a common parent, that the attribute likely not visually distinguishable. (This is true of the exemplary attributes "Has Product Manual" and "Has Extended Warranty," as well as many other attributes.) Thus, by constraining the system to ignore some of the attributes, the search for suitable nodes into which to place a query image can be shortened.

Another way to shorten the matching process between query images and database images is to allow for a "hint" to be input into the method, along with the query image. In short, a great deal is known about the data in the pre-existing database and the products the data describe. For example, the various nodes are know, as are the nodes in which any given vendor already has products located. Almost all products use standardized, descriptive names ("scissors," "screwdriver," etc.) These know qualities and characteristics of the data in the pre-existing database can be used to shorten searches by submitting the query image and limiting the search with a hint such as "hand tools" or even more narrowly to "screw drivers." This helps to improve accuracy of the search results and also improves the speed at which the search can be completed due to the vastly smaller number of images searched. When limited by a hint, the method will scan only those images in nodes that include, align, or are otherwise relevant to hints provided.

For example, if a search is performed in which the user is told the source vendor is a company that specializes in bathroom fixtures, the search can be constrained to omit searching product images classified in nodes irrelevant to bathroom fixture. In short, it would be extremely unlikely that the company specializing in bathroom fixtures will have pre-existing products within the database and located under the node "Outdoor Power Equipment." The query image can thus be submitted along with a hint constraining the search to "bathroom fixtures," or more narrowly to "plumbing," or more narrowly still to "showerheads," or to some other relevant category.

What is claimed is:

1. A method to generate data describing a product, the method comprising:
   in a special-purpose computer or a suitably programmed general-purpose computer:
   (a) comparing a digitized query image of the product to digitized pre-existing product images in a pre-existing product database, wherein the pre-existing product database comprises a taxonomy and an ontology, and the pre-existing product images are linked to a corresponding node in the taxonomy and also linked to attribute data and attribute value data in the ontology for each pre-existing product depicted in the pre-existing product images, wherein the taxonomy is organized according to attributes and attribute values relevant to appearance of the depicted pre-existing products and attributes and attribute values having no relevance to the appearance of the depicted pre-existing products; then
   (b) retrieving at least one pre-existing product image that most closely matches the query image based on at least one matching criterion selected in whole or in part by a user; and then
   (c) extracting from the pre-existing product database the node in the taxonomy, the attribute data, or the attribute value data linked to the pre-existing product image retrieved in step (b).

2. The method of claim 1, wherein step (c) comprises extracting the node in the taxonomy linked to the pre-existing product image retrieved in step (b).

3. The method of claim 2, wherein step (a) comprises comparing the query image to all of the pre-existing product images in a pre-existing product database; and further comprising, after step (c):
   (d) comparing the query image to pre-existing product images in the pre-existing product database that are indexed at the taxonomic node extracted in step (c); and then
   (e) retrieving and ranking by mathematical distance from the query image a number of pre-existing product images "n" from the taxonomic node extracted in step (c); and then
   (f) extracting from the "n" pre-existing product images retrieved and ranked in step (e) the attribute data and the attribute value data linked to the "n" pre-existing product images.

4. The method of claim 1, wherein step (c) comprises extracting the attribute data linked to the pre-existing product image retrieved in step (b).

5. The method of claim 1, wherein step (c) comprises extracting the attribute value data linked to the pre-existing product image retrieved in step (b).

6. The method of claim 1, wherein step (c) comprises extracting the node in the taxonomy, the attribute data, and the attribute value data linked to the pre-existing product image retrieved in step (b).

7. The method of claim 1, wherein step (b) comprises retrieving the pre-existing product image based on a matching criterion selected from the group consisting of color histogram and edge detection histogram.

8. The method of claim 1, further comprising, after step (c):
   (d) associating the node in the taxonomy, the attribute data, or the attribute value data retrieved in step (b) with the query image.

9. The method of claim 8, further comprising, after step (d):
   (e) saving the query image within the pre-existing product database at the associated node from step (d).

10. The method of claim 1, further comprising, after step (c):
    (d) associating the node in the taxonomy retrieved in step (b) with the query image.

11. The method of claim 1, further comprising, after step (c):
    (d) associating the attribute data retrieved in step (b) with the query image.

12. The method of claim 1, further comprising, after step (c):
    (d) associating the attribute value data retrieved in step (b) with the query image.

13. The method of claim 1, further comprising, after step (c):
    (d) associating the node in the taxonomy, the attribute data, and the attribute value data retrieved in step (b) with the query image.

14. The method of claim 13, further comprising, after step (d)
    (e) saving the query image and its associated attribute data and attribute value data within the pre-existing product database at the associated node from step (d).

15. The method of claim 1, wherein the attribute data in the ontology comprise data pertaining to attributes selected from the group consisting of internal size, number of drawers, number of shelves, whether a depicted pre-existing product has an ice-maker, whether a depicted pre-existing product has a water dispenser, whether a depicted pre-existing product has a product manual, and whether a depicted pre-existing product has an extended warranty.

16. A method to generate data describing a product, the method comprising:

in a special-purpose computer or a suitably programmed general-purpose computer:

(a) comparing a digitized query image of the product to digitized pre-existing product images in a pre-existing product database, wherein the pre-existing product database comprises a taxonomy and an ontology, and the pre-existing product images are linked to a corresponding node in the taxonomy and also linked to attribute data and attribute value data in the ontology for each pre-existing product depicted in the pre-existing product images, wherein the pre-existing products depicted in the pre-existing product images are selected from the group consisting of a power tool, a hand tool, a vehicle, a padlock, a lighting fixture, a lamp, a musical instrument, a kitchen appliance, a coffee maker, a television, a mirror, furniture, a video game controller, a bathroom fixture, and a cooking tool or utensil; then (b) retrieving at least one pre-existing product image that most closely matches the query image based on at least one matching criterion selected in whole or in part by a user; then (c) extracting from the pre-existing product database the node in the taxonomy, the attribute data, and the attribute value data linked to the pre-existing product image retrieved in step (b); then (d) associating the node in the taxonomy, the attribute data, and the attribute value data retrieved in step (b) with the query image; and then (e) saving the query image and its associated attribute data and attribute value data within the pre-existing product database at the associated node from step (d).

17. The method of claim 16, wherein step (b) comprises retrieving the pre-existing product image based on a matching criterion selected from the group consisting of color histogram and edge detection histogram.

18. The method of claim 16, wherein the attribute data in the ontology comprise data pertaining to attributes selected from the group consisting of internal size, number of drawers, number of shelves, whether a depicted pre-existing product has an ice-maker, whether a depicted pre-existing product has a water dispenser, whether a depicted pre-existing product has a product manual, and whether a depicted pre-existing product has an extended warranty.

19. A method to generate data describing a product, the method comprising:

in a special-purpose computer or a suitably programmed general-purpose computer:

(a) comparing a digitized query image of the product to digitized pre-existing product images in a pre-existing product database, wherein the pre-existing product database comprises a taxonomy and an ontology, and the pre-existing product images are linked to a corresponding node in the taxonomy and also linked to attribute data and attribute value data in the ontology for each pre-existing product depicted in the pre-existing product images, wherein the taxonomy is organized according to attributes and attribute values relevant to appearance of the depicted pre-existing products and attributes and attribute values having no relevance to the appearance of the depicted pre-existing products; then (b) retrieving at least one pre-existing product image that most closely matches the query image based on at least one matching criterion selected in whole or in part by a user; then (c) extracting from the pre-existing product database the node in the taxonomy linked to the pre-existing product image retrieved in step (b); then (d) comparing the query image to pre-existing product images in the pre-existing product database that are indexed at the taxonomic node extracted in step (c); then (e) retrieving and ranking by mathematical distance from the query image a number of pre-existing product images "n" from the taxonomic node extracted in step (c); and then (f) extracting from the "n" pre-existing product images retrieved and ranked in step (e) the attribute data and the attribute value data linked to the "n" pre-existing product images.

20. The method of claim 19, further comprising, after step (f):

(g) associating the node in the taxonomy, the attribute data, and the attribute value data retrieved in step (b) with the query image; and then (h) saving the query image and its associated attribute data and attribute value data within the pre-existing product database at the associated node from step (g).

\* \* \* \* \*